US007328297B2

(12) United States Patent
Chu

(10) Patent No.: US 7,328,297 B2
(45) Date of Patent: *Feb. 5, 2008

(54) COMPUTER SYSTEM UTILIZING MULTIPLE COMPUTER MODULES FUNCTIONING INDEPENDENTLY

(75) Inventor: William W. Y. Chu, Los Altos, CA (US)

(73) Assignee: ACQIS Technology, Inc., Mountain View, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 11/104,169

(22) Filed: Apr. 8, 2005

(65) Prior Publication Data

US 2005/0174729 A1    Aug. 11, 2005

Related U.S. Application Data

(63) Continuation of application No. 10/772,214, filed on Feb. 3, 2004, now Pat. No. 7,099,981, which is a continuation of application No. 09/569,758, filed on May 12, 2000, now Pat. No. 6,718,415.

(60) Provisional application No. 60/134,122, filed on May 14, 1999.

(51) Int. Cl.
  *G06F 12/00* (2006.01)
(52) U.S. Cl. ...................... 710/301; 710/313; 710/315; 710/63; 710/72; 709/227; 709/248
(58) Field of Classification Search ........ 710/300–317, 710/8–19, 62–64, 72–73; 713/200–202; 709/214, 217, 219, 226, 227, 248
See application file for complete search history.

(56) References Cited

U.S. PATENT DOCUMENTS 3,996,585 A    12/1976  Hogan (Continued)

FOREIGN PATENT DOCUMENTS

EP             722138 A1    7/1996

(Continued)

OTHER PUBLICATIONS

Agerwala, T., Systems Journal "SP2 System Architecture" vol. 34, No. 2, 1995 Scalable Parallel Computing vol. 34, No. 2, 1995.

(Continued)

*Primary Examiner*—Raymond N Phan
(74) *Attorney, Agent, or Firm*—Townsend and Townsend and Crew LLP

(57) ABSTRACT

A computer system for multi-processing purposes. The computer system has a console comprising a first coupling site and a second coupling site. Each coupling site comprises a connector. The console is an enclosure that is capable of housing each coupling site. The system also has a plurality of computer modules, where each of the computer modules is coupled to a connector. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

88 Claims, 8 Drawing Sheets

U.S. PATENT DOCUMENTS

| | | | |
|---|---|---|---|
| 4,623,964 | A | 11/1986 | Getz et al. |
| 4,700,362 | A | 10/1987 | Todd et al. |
| 4,769,764 | A | 9/1988 | Levanon |
| 4,872,091 | A | 10/1989 | Maniwa et al. |
| 4,890,282 | A | 12/1989 | Lambert et al. |
| 4,918,572 | A | 4/1990 | Tarver et al. |
| 4,939,735 | A | 7/1990 | Fredericks et al. |
| 5,056,141 | A | 10/1991 | Dyke |
| 5,086,499 | A | 2/1992 | Mutone |
| 5,251,097 | A | 10/1993 | Simmons et al. |
| 5,278,509 | A | 1/1994 | Haynes et al. |
| 5,278,730 | A | 1/1994 | Kikinis |
| 5,293,497 | A | 3/1994 | Free |
| 5,311,397 | A | 5/1994 | Harshberger et al. |
| 5,317,477 | A | 5/1994 | Gillett |
| 5,319,771 | A | 6/1994 | Takeda |
| 5,331,509 | A | 7/1994 | Kikinis |
| 5,355,391 | A | 10/1994 | Horowitz et al. |
| 5,428,806 | A | 6/1995 | Pocrass |
| 5,436,857 | A | 7/1995 | Nelson et al. |
| 5,463,742 | A | 10/1995 | Kobayashi |
| 5,539,616 | A | 7/1996 | Kikinis |
| 5,550,710 | A | 8/1996 | Rahamim et al. |
| 5,550,861 | A | 8/1996 | Chan et al. |
| 5,578,940 | A | 11/1996 | Dillon |
| 5,600,800 | A | 2/1997 | Kikinis et al. |
| 5,603,044 | A | 2/1997 | Annapareddy et al. |
| 5,606,717 | A | 2/1997 | Farmwald et al. |
| 5,608,608 | A | 3/1997 | Flint et al. |
| 5,630,057 | A | 5/1997 | Hait |
| 5,638,521 | A | 6/1997 | Buchala et al. |
| 5,640,302 | A | 6/1997 | Kikinis |
| 5,659,773 | A | 8/1997 | Huynh et al. |
| 5,663,661 | A | 9/1997 | Dillon et al. |
| 5,673,174 | A | 9/1997 | Hamirani |
| 5,680,126 | A | 10/1997 | Kikinis |
| 5,689,654 | A | 11/1997 | Kikinis |
| 5,721,837 | A | 2/1998 | Kikinis |
| 5,721,842 | A | 2/1998 | Beasley et al. |
| 5,745,733 | A | 4/1998 | Robinson |
| 5,752,080 | A | 5/1998 | Ryan |
| 5,764,924 | A | 6/1998 | Hong |
| 5,774,704 | A | 6/1998 | Williams |
| 5,795,228 | A | 8/1998 | Trumbull |
| 5,809,538 | A | 9/1998 | Pollmann |
| 5,815,681 | A | 9/1998 | Kikinis |
| 5,819,050 | A | 10/1998 | Boehling et al. |
| 5,826,048 | A | 10/1998 | Dempsey et al. |
| 5,848,249 | A | 12/1998 | Garbus |
| 5,859,669 | A | 1/1999 | Prentice |
| 5,907,566 | A | 5/1999 | Benson et al. |
| 5,941,965 | A | 8/1999 | Moroz |
| 5,948,047 | A | 9/1999 | Jenkins et al. |
| 5,960,213 | A | 9/1999 | Wilson |
| 5,968,144 | A | 10/1999 | Walker et al. |
| 5,971,804 | A | 10/1999 | Gallagher et al. |
| 5,977,989 | A | 11/1999 | Lee et al. |
| 5,978,919 | A * | 11/1999 | Doi et al. .................... 726/36 |
| 5,982,363 | A | 11/1999 | Naift |
| 5,991,163 | A | 11/1999 | Marconi et al. |
| 5,991,844 | A | 11/1999 | Khosrowpour |
| 5,999,952 | A | 12/1999 | Jenkins et al. |
| 6,002,442 | A | 12/1999 | Li et al. |
| 6,003,105 | A | 12/1999 | Vicard et al. |
| 6,011,546 | A | 1/2000 | Bertram |
| 6,016,252 | A | 1/2000 | Pignolet et al. |
| 6,025,989 | A * | 2/2000 | Ayd et al. ................... 361/695 |
| 6,028,643 | A | 2/2000 | Jordan et al. |
| 6,029,183 | A | 2/2000 | Jenkins et al. |
| 6,038,621 | A | 3/2000 | Gale et al. |
| 6,040,792 | A | 3/2000 | Watson et al. |
| 6,052,513 | A | 4/2000 | McLaren |
| 6,069,615 | A | 5/2000 | Abraham et al. |
| 6,088,224 | A | 7/2000 | Gallagher et al. |
| 6,088,752 | A | 7/2000 | Ahern |
| 6,157,534 | A | 12/2000 | Gallagher et al. |
| 6,161,524 | A * | 12/2000 | Akbarian et al. ........... 123/478 |
| 6,163,464 | A | 12/2000 | Ishibashi et al. |
| 6,175,490 | B1 | 1/2001 | Papa et al. |
| 6,202,169 | B1 | 3/2001 | Razzaghe-Ashrafi et al. |
| 6,208,522 | B1 | 3/2001 | Manweiler et al. |
| 6,216,185 | B1 | 4/2001 | Chu |
| 6,260,155 | B1 | 7/2001 | Dellacona |
| 6,289,376 | B1 | 9/2001 | Taylor et al. |
| 6,304,895 | B1 | 10/2001 | Schneider et al. |
| 6,311,268 | B1 | 10/2001 | Chu |
| 6,314,522 | B1 | 11/2001 | Chu et al. |
| 6,317,329 | B1 | 11/2001 | Dowdy et al. |
| 6,321,335 | B1 | 11/2001 | Chu |
| 6,332,180 | B1 | 12/2001 | Kauffman et al. |
| 6,345,330 | B2 | 2/2002 | Chu |
| 6,366,951 | B1 | 4/2002 | Schmidt |
| 6,378,009 | B1 | 4/2002 | Pinkston, II et al. |
| 6,381,602 | B1 | 4/2002 | Shoroff et al. |
| 6,393,561 | B1 | 5/2002 | Hagiwara et al. |
| 6,401,124 | B1 | 6/2002 | Yang et al. |
| 6,425,033 | B1 | 7/2002 | Conway et al. |
| 6,452,789 | B1 | 9/2002 | Pallotti et al. |
| 6,452,790 | B1 | 9/2002 | Chu et al. |
| 6,453,344 | B1 | 9/2002 | Ellsworth |
| 6,496,361 | B2 | 12/2002 | Kim et al. |
| 6,549,966 | B1 | 4/2003 | Dickens et al. |
| 6,564,274 | B1 | 5/2003 | Heath et al. |
| 6,643,777 | B1 | 11/2003 | Chu |
| 6,718,415 | B1 | 4/2004 | Chu |
| 6,725,317 | B1 | 4/2004 | Bouchier et al. |
| 7,099,981 | B2 | 8/2006 | Chu |
| 7,146,446 | B2 * | 12/2006 | Chu .......................... 710/301 |

FOREIGN PATENT DOCUMENTS

| | | |
|---|---|---|
| JP | 6-289953 | 10/1994 |
| WO | WO 92/18924 | 10/1992 |
| WO | WO 94/00097 | 1/1994 |
| WO | WO 95/13640 | 5/1995 |

OTHER PUBLICATIONS

CETIA Brochure "CETIA Powerengine CVME 603e" pp. 1-6 downloaded from the internet at. http://www.cetia.com/ProductAddOns/wp-47-01.pdf on Feb. 15, 2006.

MPL Brochure "1st Rugged All in One Industrial 486FDX-133 MHz PC" pp. 1-2, downloaded from the internet at. http://www.mpl.ch/DOCs/ds48600.pdf on Feb. 15, 2006.

MPL Brochure "IPM 486 Brochure/IPM5 User Manual" pp. 1-9 downloaded from the internet at http://www.mpl.ch/DOCs/u48600xd.pdf on Feb. 15, 2006.

Snyder, Joel "Better Management through consolidation" pp. 1-6 downloaded from the internet at http://www.opus1.com/www/jms/nw-con-0818rev.html.

Bernal, Carlos, product brochure entitled: "PowerSMP Series 4000", (Mar. 1998) <<http://www/winnetmag,com/Windows/Article/ArticleID/3095//3095.html, downloaded from web on Jun. 22, 2004, 2 pgs.

Cragle, Jonathan, "Density System 1100", May 1999) <<http://www.winnetmag.com/Windows/Article/ArticleID/5199/5199.html>>, downloaded from web on Jun. 21, 2004, 4 pgs.

Feldman, Jonathan, "Rack Steady: The Four Rack-Mounted Servers That Rocked Our Network", <<http://www.networkcomputing.com/shared/printArticle.jhtml?article=/910/910r3side1.htm...>> Jun. 23, 2004, 3 pgs.

Fetters, Dave, "Cubix High-Density Server Leads the Way With Standout Management Software", (Feb. 8, 1999) <<http://www.nwc.com/shared/printArticle.jhtml?article=/1003/1003r3full.html&pub=nwc>>, downloaded from web on Jun. 23, 2004, 5 pgs.

Gardner, Michael and Null, Christopher, "A Server Condominium", <<http://www.lantimes.com/testing/98jun/806a042a.html>>, Jun. 23, 2004, 3 pgs.

Harrison, Dave, "VME in the Military: The M1A2 Main Battle Tank Upgrade Relies on COTS VME" <<http://www.dy4.com>>, (Feb. 9, 1998), pp. 1-34.

Williams, Dennis, "Consolidated Servers", (Feb. 17, 1997) <<http://www.lantimes.com/testing/97compare/pcconsol.html>> downloaded from web on Jun. 23, 2004, 2 pgs.

Williams, Dennis, "Executive Summary: Consolidate Now", (Feb. 17, 1997) <<http://www.lantimes.com/testing/97feb/702b064a.html>> downloaded from web on Jun. 23, 2004, 2 pgs.

Williams, Dennis, "Top Scores for Useability and Openness", (Feb. 17, 1997) <<http://www.lantimes.com/testing/97feb/702b064a.html>> downloaded from web on Jun. 23, 2004, 2 pgs.

Williams, Dennis, "ChatCom Inc. Chatterbox", (Feb. 17, 1997) <<http://www.lantimes.com/testing/97feb/702b066a.html>> downloaded from web on Jun. 23, 2004, 3 pgs.

Williams, Dennis, "EVERSYS Corp. System 8000", (Feb. 17, 1997) <<http://www.lantimes.com/testing/97feb/702b070b.html>> downloaded from web on Jun. 22, 2004, 4 pgs.

Williams, Dennis, "Cubix Corp. ERS/FT II", (Feb. 17, 1997) <<http://www.lantimes.com/testing/97feb/702b068b.html>> downloaded from web on Jun. 23, 2004, 4 pgs.

Crystal Advertisement for "Rackmount Computers", ( © 2000-2004) <<http://www.crystalpc.com/products/roservers.asp>>, downloaded from web on Jun. 17, 2004, 8 pgs.

Crystal Advertisement for "QuickConnect® Cable Management", ( © 2000-2004) <<http://www.crystalpc.com/products/quickconnect.asp>> downloaded from web on Jun. 17, 2004, 4 pgs.

Cubix Product Brochure entitled, "Density System", ( © 2000) <<http://64.173.211.7/support/techinfo/system/density/density10.htm>> downloaded from web on Jun. 22, 2004, 3 pgs.

Cubix Product Brochure entitled, "Density System, Technical Specifications", ( © 2000) <<http://64.173.211.7/support/techinfo/system/density/info/spec.htm>> downloaded from web on Jun. 22, 2004, 2 pgs.

Cubix Product Manual entitled, "Density System", Chapter 1—Introduction, ( © 2000) <<http://64.173.211.7/support/techinfo/manuals/density/Chap-1.htm>> downloaded from web on Jun. 22, 2004, 5 pgs.

Cubix, "Click on the front panel that matches your system", ( © 2000) <<http://64.173.211.7/support/techinfo/system/density/density.htm>>, downloaded from web on Jun. 22, 2004, 1 pg.

Cubix Product Manual entitled, "Density System", Chapter 2—Installation, ( © 2000) <<http://64.173.211.7/support/techinfo/manuals/density/Chap-2.htm>> downloaded from web on Jun. 22, 2004, 9 pgs.

Cubix Product Manual entitled, "Density System", Chapter 3—Operation, ( © 2000) <<http://64.173.211.7/support/techInfo/manuals/density/Chap-3.htm>> downloaded from web on Jun. 22, 2004, 4 pgs.

Cubix Product Manual entitled, "Density System", Chapter 4—Maintenance and Repair, ( © 2000) <<http://64.173.211.7/support/techinfo/manuals/density/Chap-4.htm>> downloaded from web on Jun. 22, 2004, 5 pgs.

Cubix, "What are Groups?", ( © 2000) <<http://64.173.211.7/support/techinfo/system/density/info/groups.htm>>, downloaded from web on Jun. 22, 2004, 3 pgs.

Cubix, "SP 5200XS Series Plug-in Computers", ( © 2000) <<http://64.173.211.7/support/techinfo/bc/sp5200xs/intro.htm>>, downloaded from web on Jun. 22, 2004, 2 pgs.

Cubix, "SP 5200XS Series Technical Specifications", ( © 2000) <<http://64.173.211.7/support/techinfo/bc/sp5200xs/spec.htm>>, downloaded from web on Jun. 22, 2004, 2 pgs.

Cubix, "SP 5200 Series" Chapter 1—Introduction, ( © 2000) <<http://64.173.211.7/support/techinfo/manuals/sp5200/chap-1.htm>>, downloaded from web on Jun. 22, 2004, 3 pgs.

Cubix, "SP 5200 Series" Chapter 2—Switches & Jumpers, ( © 2000) <<http://64.173.211.7/support/techinfo/manuals/sp5200/chap-2.htm>>, downloaded from web on Jun. 22, 2004, 3 pgs.

Cubix, "SP 5200 Series" Chapter 3—Installation, ( © 2000) <<http://64.173.211.7/support/techinfo/manuals/sp5200/chap-3.htm>>, downloaded from web on Jun. 22, 2004, 4 pgs.

Cubix, "SP 5200 Series" Chapter 4—Technical Reference, ( © 2000) <<http://64.173.211.7/support/techinfo/manuals/sp5200/chap-4.htm>>, downloaded from web on Jun. 22, 2004, 3 pgs.

Cubix, "DP 6200 'D' Series Plug-in Computers" <<http://64.173.211.7/support/techinfo/bc/dp/6200d/intro.htm>>, downloaded from web on Jun. 22, 2004, 3 pgs.

Cubix, "Installing DP or SP Series Boards" ( © 2000) <<http://64.173.211.7/support/techinfo/bc/dp/6200d/intro.htm>>, downloaded from web on Jun. 22, 2004, 2 pgs.

Cubix, "Powering On/Off or Resetting Plug-in Computers in an Density System", ( © 2000) <<http://64.173.211.7/support/techinfo/system/density/info/power.htm>>, downloaded from web on Jun. 22, 2004, 2 pgs.

Cubix, "Multiplexing Video, Keyboard & Mouse with Multiple Density Systems", ( © 2000) <<http://64.173.211.7/support/techinfo/system/density/info/vkm-mux.htm>>, downloaded from web on Jun. 22, 2004, 2 pgs.

eBay Advertisement for "Total IT Group Network Engines", <<http://cgi.ebay.com/we/eBayISAPI.dll?Viewitem&item=5706388046&sspagename+STRK%3AMDBI%3AMEBI3AIT&rd=1>>, downloaded from web on Jun. 25, 2004, 1 pg.

"Features Chart", (Feb. 1, 1997) <<http://www.lantimes.com/testing/97feb/702b072a.html>>, downloaded from web on Jun. 23, 2004, 3 pgs.

Internet Telephone Roundup, "Industrial Computers", <<http://www.tmcnet.com/articles/itmag/0499/0499roundup.htm>>, downloaded from web on Jun. 23, 2004, 5 pgs.

Press Release: Hiawatha, Iowa, (Mar. 1, 1997) entitled "Crystal Group Products Offer Industrial PCs with Built-in Flexibility", <<http://www.crystalpc.com/news/pressreleases/prodpr.asp>>, downloaded from web on May 14, 2004, 2 pgs.

Press Release: Kanata, Ontario, Canada, (Apr. 1998) entitled "Enhanced COTS SBC from DY 4 Systems features 166MHz Pentium™ Processor" <<http://www.realtime-info.be/VPR/layout/display/pr.asp?PRID=363>>, 2 pgs.

Product Brochure entitled "SVME/DM-192 Pentium® II Single Board Computer" (Jun. 1999) pp. 1-9.

Product Brochure entitled "System 8000", <<http://www.bomara.com/Eversys/briefDefault.htm>>, downloaded from web on Jun. 22, 2004, 4 pgs.

Product Brochure entitled: "ERS/FT II System", ( © 2000) <<http://64.173.211.7/support/techinfo/system/ersft2/ersft2.htm>>, downloaded from web on Jun. 22, 2004, 4 pgs.

Product Manual entitled: "ERS II and ERS/FT II", Chap. 3, System Components, <<http://64.173.211.7/support/techinfo/manuals/ers2/ers2-c3.htm>>, downloaded from web on Jun. 22, 2004, 21 pgs.

Product Manual entitled: "ERS II and ERS/FT II", Chap. 6, Component Installation, <<http://64.173.211.7/support/techinfo/manuals/ers2/ers2-c6.htm>>, downloaded from web on Jun. 22, 2004, 18 pgs.

Windows Magazine, "Cubix PowerSMP Series 4000", Nov. 1997, <http://<www.techweb.com/winmag/library/1997/1101/ntent008.htm>> downloaded from the web on Jun. 22, 2004, p. NT07.

MPL, "The First Rugged All-in-One Industrial 486FDX-133 MHz PC", IPM486/IPM5 User Manual, 1998, pp. 1-24.

Notice of Allowance (mailed on Jul. 27, 2007) of Application No. 11/124,851, filed May 4, 2005, Inventor: William W. Y. Chu, 6 pages.

* cited by examiner

COMPUTER SYSTEM UTILIZING MULTIPLE COMPUTER MODULES FUNCTIONING INDEPENDENTLY

CROSS REFERENCE TO RELATED APPLICATIONS

The present application claims priority as a continuation of U.S. nonprovisional patent application Ser. No. 10/772,214, filed Feb. 3, 2004, now U.S. Pat. No. 7,099,981, which is a continuation of U.S. nonprovisional patent application Ser. No. 09/569,758, filed May 12, 2000 (Now U.S. Pat. No. 6,718,415), which claimed priority to U.S. Provisional Application No. 60/134,122 filed May 14, 1999, commonly assigned, and hereby incorporated by reference.

BACKGROUND OF THE INVENTION

The present invention relates to computing devices. More particularly, the present invention provides a system including a plurality of computer modules that can independently operate to provide backup capability, dual processing, and the like. Merely by way of example, the present invention is applied to a modular computing environment for desk top computers, but it will be recognized that the invention has a much wider range of applicability. It can be applied to a server as well as other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive such as memory in the giga-bit range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 20 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a curser on the display from one location to another location.

Other types of computing devices include portable computing devices such as "laptop" computers and the like. Although somewhat successful, laptop computers have many limitations. These computing devices have poor display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals the are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use.

Similar to separate desktop and portable computers, there is no commonality between two desktop computers. To date, most personal computers are constructed with a single motherboard that provides connection for CPU and other components in the computer. Dual CPU systems have been available through Intel's slot 1 architecture. For example, two Pentium II cartridges can be plugged into two "slot 1" card slots on a motherboard to form a Dual-processor system. The two CPU's share a common host bus that connects to the rest of the system, e.g. main memory, hard disk drive, graphics subsystem, and others. Dual CPU systems have the advantage of increased CPU performance for the whole system. Adding a CPU cartridge requires no change in operating systems and application software. However, dual CPU systems may suffer limited performance improvement if memory or disk drive bandwidth becomes the limiting factor. Also, dual CPU systems have to time-share the processing unit in running multiple applications. CPU performance improvement efficiency also depends on software coding structure. Dual CPU systems provide no hardware redundancy to help fault tolerance. In running multiple applications, memory and disk drive data throughput will become the limiting factor in improving performance with multi-processor systems.

Thus, what is needed are computer systems that can have multiple computer modules. Each computer module has dedicated memory and disk drive, and can operate independently.

BRIEF SUMMARY OF THE INVENTION

According to the present invention, a technique including a method and device for multi-module computing is provided. In an exemplary embodiment, the present invention provides a system including a plurality of computer modules that can independently operate to provide backup capability, dual processing, and the like.

In a specific embodiment, the present invention provides a computer system for multi-processing purposes. The computer system has a console comprising a first coupling site and a second coupling site, e.g., computer module bay. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

In an alternative specific embodiment, the present invention provides a multi-processing computer system. The system has a console comprising a first coupling site and a second coupling site. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, a mass storage device coupled to the processing unit, and a video output coupled to the processing unit. Each of the computer modules is substantially similar in design to each other to provide independent processing of each of the computer modules in the computer system. A video switch circuit is coupled to each of the computer modules through the video output. The video switch is configured to switch a video signal from any one of the computer modules to a display.

Numerous benefits are achieved using the present invention over previously existing techniques. In one embodiment, the invention provides improved processing and maintenance features. The invention can also provide increased CPU performance for the whole system. The invention also can be implemented without changes in operating system and application software. The present invention is also implemented using conventional technologies that can be provided in the present computer system in an easy and efficient manner.

In another embodiment, the invention provides at least two users to share the same modular desktop system. Each user operates on a different computer module. The other peripheral devices, i.e. CDROM, printer, DSL connection, etc. can be shared. This provides lower system cost, less desktop space and more efficiency. Depending upon the embodiment, one or more of these benefits can be available. These and other advantages or benefits are described throughout the present specification and are described more particularly below.

In still further embodiments, the present invention provides methods of using multiple computer modules.

According to the present invention, a technique including a method and device for securing a computer module using a password in a computer system is provided. In an exemplary embodiment, the present invention provides a security system for an attached computer module ("ACM"). In an embodiment, the ACM inserts into a Computer Module Bay (CMB) within a peripheral console to form a functional computer.

In a specific embodiment, the present invention provides a computer module. The computer module has an enclosure that is insertable into a console. The module also has a central processing unit (i.e., integrated circuit chip) in the enclosure. The module has a hard disk drive in the enclosure, where the hard disk drive is coupled to the central processing unit. The module further has a programmable memory device in the enclosure, where the programmable memory device can be configurable to store a password for preventing a possibility of unauthorized use of the hard disk drive and/or other module elements. The stored password can be any suitable key strokes that a user can change from time to time. In a further embodiment, the present invention provides a permanent password or user identification code stored in flash memory, which also can be in the processing unit, or other integrated circuit element. The permanent password or user identification code is designed to provide a permanent "finger print" on the attached computer module.

In a specific embodiment, the present invention provides a variety of methods. In one embodiment, the present invention provides a method for operating a computer system such as a modular computer system and others. The method includes inserting an attached computer module ("ACM") into a bay of a modular computer system. The ACM has a microprocessor unit (e.g., microcontroller, microprocessor) coupled to a mass memory storage device (e.g., hard disk). The method also includes applying power to the computer system and the ACM to execute a security program, which is stored in the mass memory storage device. The method also includes prompting for a user password from a user on a display (e.g., flat panel, CRT). In a further embodiment, the present method includes a step of reading a permanent password or user identification code stored in flash memory, or other integrated circuit element. The permanent password or user identification code provides a permanent finger print on the attached computer module. The present invention includes a variety of these methods that can be implemented in computer codes, for example, as well as hardware.

Numerous benefits are achieved using the present invention over previously existing techniques. The present invention provides mechanical and electrical security systems to prevent theft or unauthorized use of the computer system in a specific embodiment. Additionally, the present invention substantially prevents accidental removal of the ACM from the console. In some embodiments, the present invention prevents illegal or unauthorized use during transit. The present invention is also implemented using conventional technologies that can be provided in the present computer system in an easy and efficient manner. Depending upon the embodiment, one or more of these benefits can be available. These and other advantages or benefits are described throughout the present specification and are described more particularly below.

These and other embodiments of the present invention, as well as its advantages and features, are described in more detail in conjunction with the text below and attached Figs.

DETAILED DESCRIPTION OF THE INVENTION

According to the present invention, a technique including a method and device for multi-module computing is provided. In an exemplary embodiment, the present invention provides a system including a plurality of computer modules that can independently operate to provide backup capability, dual processing, and the like.

Figure 1:
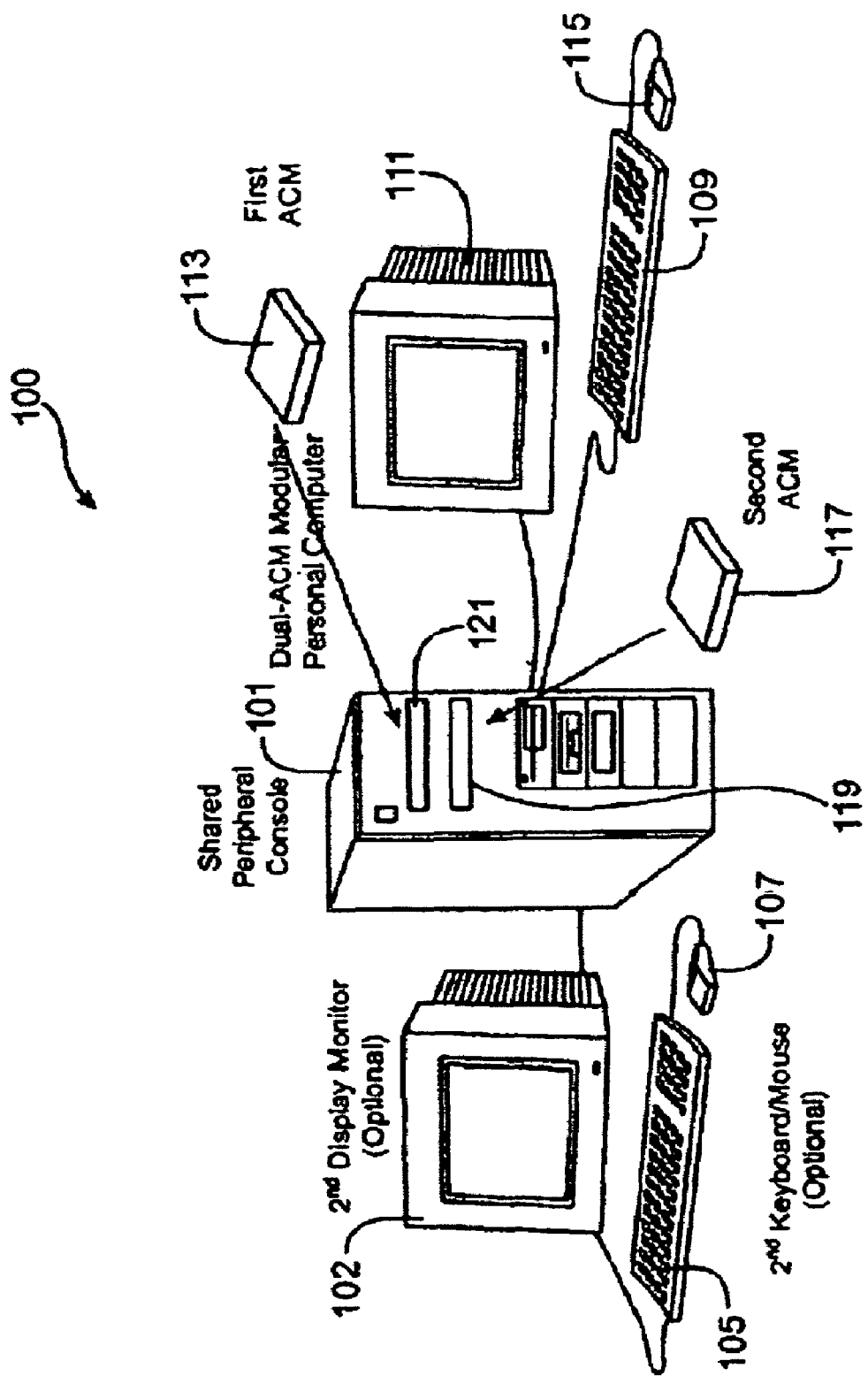
FIG. 1 is a simplified diagram of a computer system according to an embodiment of the present invention.

FIG. 1 is a simplified diagram of a computer system 100 according to an embodiment of the present invention. This diagram is merely an illustration and should not limit the scope of the claims herein. One of ordinary skill in the art would recognize other variations, modifications, and alternatives. The computer system 100 includes an attached computer module (i.e., ACM) 113, a desktop console 101, among other elements. The computer system also has another ACM module 117. Each ACM module has a respective slot 121, 119, which mechanically houses and electrically couples each ACM to the computer console. Also shown is a display 111, which connects to the console. Additionally, keyboard 109 and mouse 115 are also shown. A second display 102, keyboard 105, and mouse 107 can be coupled to the console in some optional embodiments to allow more than one user to operate the computer system. The computer system is modular and has a variety of components that are removable. Some of these components (or modules) can be used in different computers, workstations, computerized television sets, and portable or laptop units.

In the present embodiment, each ACM 113 includes computer components, as will be described below, including a central processing unit ("CPU"), IDE controller, hard disk drive, computer memory, and the like. The computer module bay (i.e., CMB) 121 is an opening or slot in the desktop console. The CMB houses the ACM and provides communication to and from the ACM. The CMB also provides mechanical protection and support to the ACM. The CMB has a mechanical alignment mechanism for mating a portion of the ACM to the console. The CMB further has thermal heat dissipation sinks, electrical connection mechanisms, and the like. Some details of the ACM can be found in co-pending patent application Ser. Nos. 09/149,882 and 09/149,548 filed Sep. 8, 1998, commonly assigned, and hereby incorporated by reference for all purposes.

In a specific embodiment, the present multiple computer module system has a peripheral console that has two or more computer bays that can receive a removable computer module or ACM. Multiple computer module system can function as a personal computer with only one ACM and the peripheral console. The second and additional ACM can be added later to increase overall system performance and reliability. The ACM operates independently as self-contained computer, communicates with each other through a high-speed serial communication and share most peripheral devices within the peripheral console. Each ACM controls its independent graphics subsystem and drives separate video output signals. A practical implementation is a dual ACM system. In a dual ACM system, two monitors can be used to display the two ACMs' graphics outputs at the same time. For a single monitor, a RGB switch is used to switch between the video outputs of the two ACMs and can be controlled by a command from the user. Similarly, input devices (i.e. keyboard and mouse) are switched between the two computer systems with a command from the user. Command from the user can be in the form of either a dedicated key on the keyboard or a special icon on the screen that the mouse can click on.

In most embodiments, the ACM includes an enclosure such as the one described with the following components, which should not be limiting:

1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present system are described in more detail below. In a dual ACM system, the primary ACM can connect directly to the peripheral board in the peripheral console. The second ACM can connect either directly or indirectly to the peripheral board. For indirect connection, a receptacle board is added to allow a cable connection to the peripheral board. This is to facilitate the mechanical positioning of the second ACM inside the computer chassis. The receptacle board approach can even be used for the primary ACM if a high bandwidth peripheral bus, e.g. PCI Bus, is not connected from the primary ACM to the peripheral board.

The shared peripheral console has a chassis and a motherboard that connects the following devices:

1) Input means, e.g. keyboard and mouse,
2) Display means, e.g. RGB monitor,
3) Add-on means, e.g. PCI add-on slots,
4) Two Computer Module Bays (CMB) with connectors to two ACMs,
5) A serial communication Hub controller that interfaces to serial communication controller of both ACMs,
6) Shared storage subsystem, e.g. Floppy drive, CDROM drive, DVD drive, or 2nd Hard Drive,
7) Communication device, e.g. modem,
8) Power supply, and others.

The computer bay is an opening in the peripheral console that receives an ACM. CMB provides mechanical protection to ACM, mechanical alignment for connector mating, mechanical locking system to prevent theft and accidental removal, and connectors at the end of the opening for connecting to ACM. The interface bus between ACM and the peripheral console has a video bus, peripheral connections, serial communication connection, control signals and power connection. Video bus includes video output of graphics devices, i.e. analog RGB and control signals for monitor. Power connection supplies the power for ACM.

Figure 2:
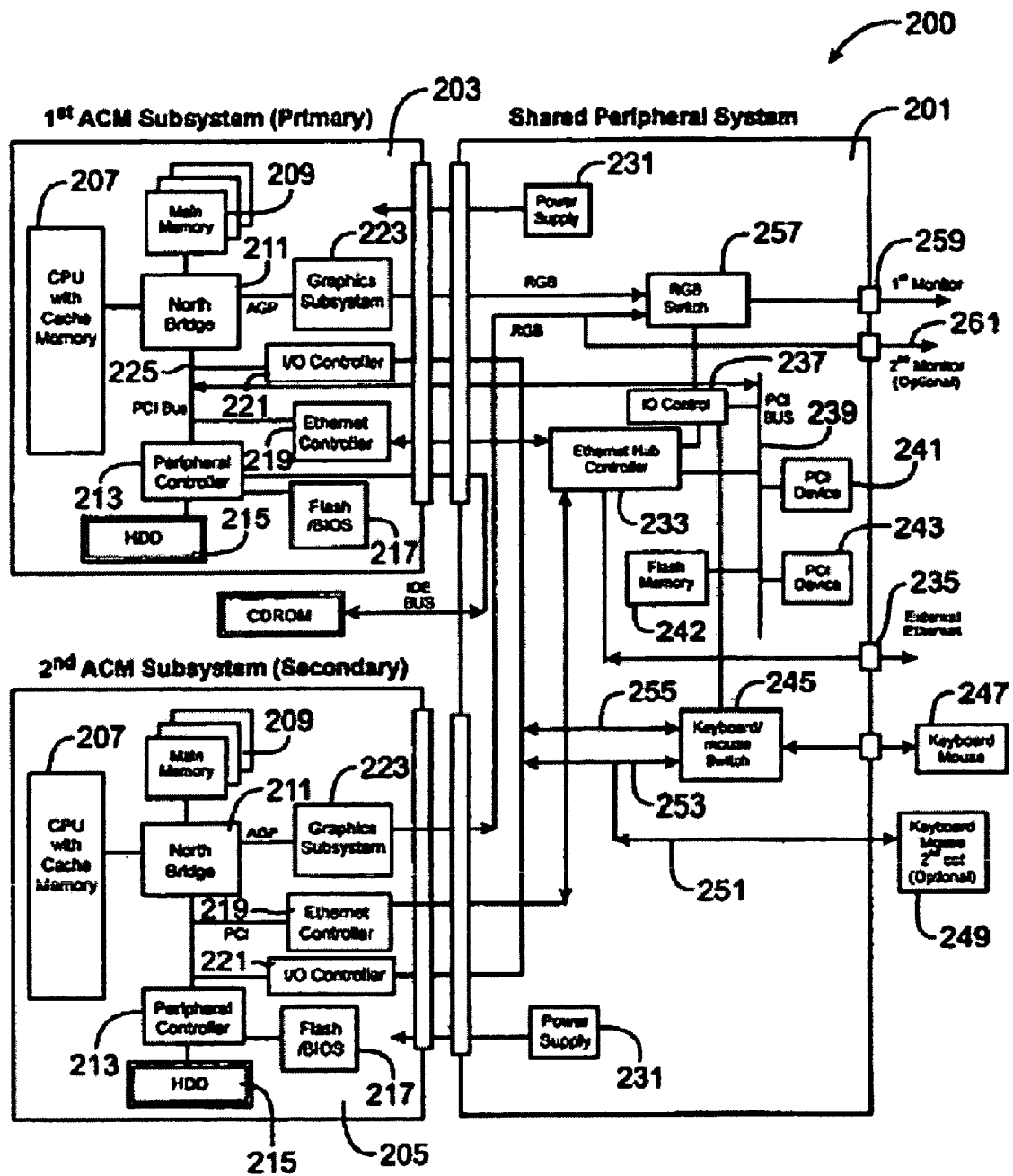
FIG. 2 is a simplified block diagram of a computer system according to an alternative embodiment of the present invention.

An implementation of peripheral sharing is the use of Ethernet controllers to bridge the communication between the two ACMs. Some of the peripheral devices residing in the peripheral console are shown in the simplified diagram of FIG. 2. As shown, the diagram is merely an illustration which should not limit the scope of the claims herein. One of ordinary skill in the art would recognize many other variations, alternatives, and modifications. As shown, a primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE.

Among other features, the computer system includes an ACM with security protection.

The ACM also has a network controller, which can be an Ethernet controller 219, which is coupled to the North Bridge through the PCI bus. The North Bridge is coupled to the CPU. The Ethernet controller can be a 10/100 Base, such as Intel's 82559 or the like. Other types of network connection devices can also be used. For example, the invention can use Gbit Ethernet 1394, and USB 2.0. The network controller couples to a hub 233 in the console, which includes shared peripheral system 201.

Also shown is the second ACM 205. The second ACM has the same or similar components as the first ACM. Here, like reference numerals have been used for easy cross-referencing, but is not intended to be limiting. In some embodiments, the secondary ACM is not connected to the PCI bus in the peripheral console directly. The secondary ACM 219 accesses peripheral devices controlled by the primary ACM through the Ethernet connection to the primary ACM, e.g. CD-ROM, or PCI modem. The implementation is not restricted to Ethernet serial communication and can use other high-speed serial communication such as USB 2.0, and 1394. The Ethernet hub is coupled to an external output port 235, which connects to an external network.

The primary hard disk drive in each ACM can be accessed by the other ACM as sharable hard drive through the Ethernet connection. This allows the easy sharing of files between the two independent computer modules. The Ethernet Hub Controller provides the high-speed communication function between the two computer modules. Ethernet data bandwidth of 100 Mbit/sec allows fast data communication between the two computer modules. The secondary ACM access peripheral devices of the primary ACM through the network connection provided by Ethernet link. The operating system, e.g. Windows 98, provides the sharing of resources between the two ACMs. In some embodiments, critical data in one ACM can be backup into the other ACM.

The Ethernet hub also couples to PCI bus 239, which connects to PCI devices 241, 243, e.g., modem, SCSI controller. A flash memory 242 can also be coupled to the PCI bus. The flash memory can store passwords and security information, such as those implementations described in U.S. Ser. No. 09/183,493, which is commonly owned, and hereby incorporated by reference. The hub 233 also couples to an I/O control 237, which connects to keyboard/mouse switch 245, which couples to keyboard/mouse 247. Optionally, the keyboard/mouse switch also couples to a second keyboard/house 259 via PS2 or USB signal line 251. The keyboard/mouse switch has at least a first state and a second state, which allow operation of respectively multiple keyboards or a single keyboard. The switch also couples to each I/O controller 221 in each ACM via lines 253, 255. The I/O control 237 also couples to an RGB switch 257, which allows video signals to pass to the first monitor 259. Alternatively, the RGB switch couples to a second monitor 261. The RGB switch includes analog video switches such as MAXIM's MAX4545.

The peripheral system 201 also has an independent power supply 231 for each ACM. Each power supply provides power to each ACM. As merely an example, the power supply is a MICRO ATX 150W made by ENLIGHT, but can be others. The power supply is connected or coupled to each ACM through a separate line, for example. The independent power supply allows for independent operation of each ACM in some embodiments.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 3:
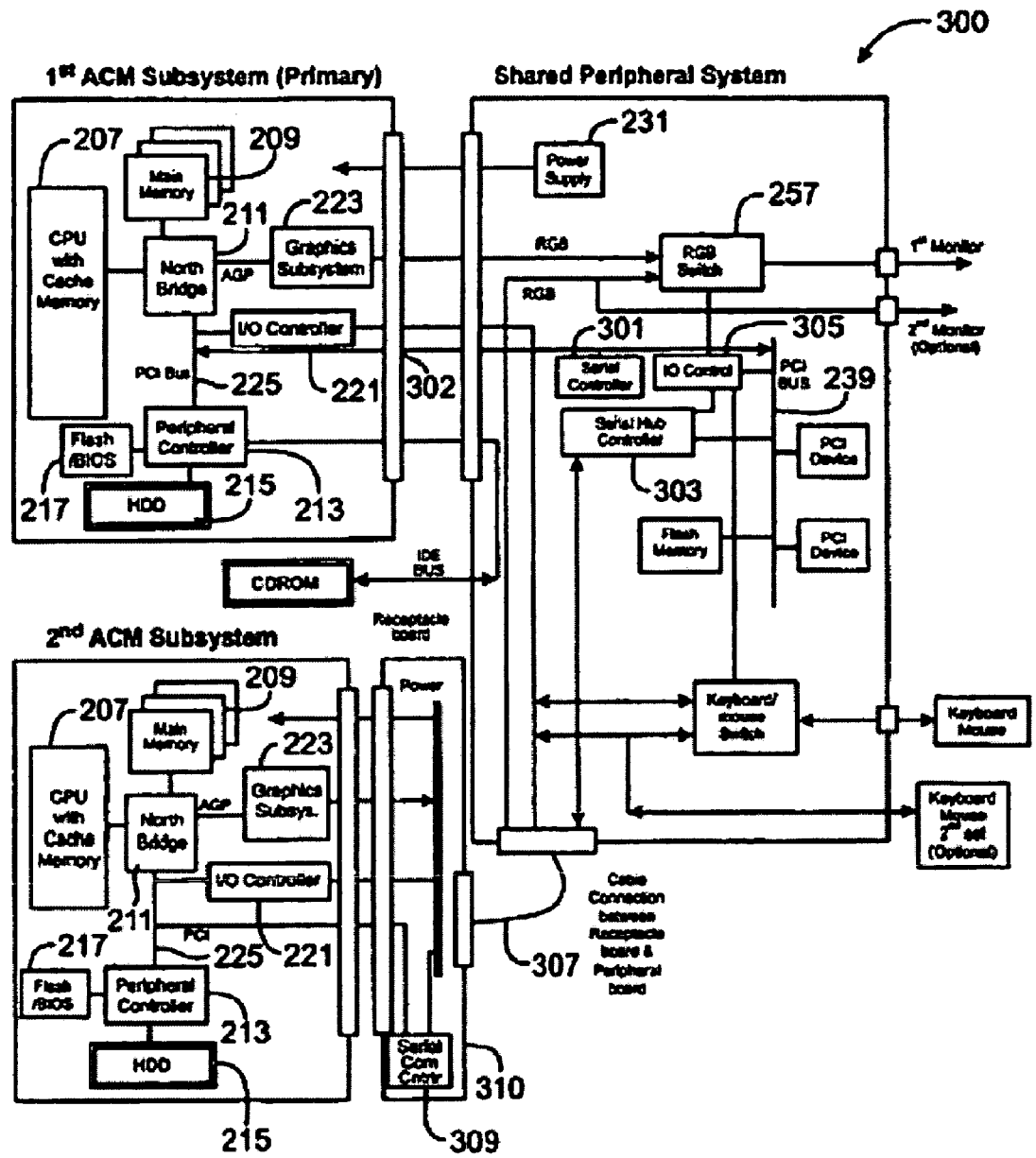
FIG. 3 is a simplified block diagram of a computer system according to a further alternative embodiment of the present invention.

FIG. 3 is a simplified block diagram 300 of a computer system according to an alternative embodiment of the present invention. This diagram is merely an example which should not limit the scope of the claims herein. One of ordinary skill in the art would recognizes many other variations, modifications, and alternatives. Like reference numerals are used in this Fig. as the previous Fig. for easy referencing, but are not intended to be limiting. As shown, each ACM includes common elements as the previous Fig. A primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE.

Among other features, the computer system includes an ACM with security protection.

The ACM also has a network controller, which can be coupled to a serial port 302, which is coupled to the PCI bus in the ACM. The serial port is coupled to the peripheral console through a serial controller 301 in the serial console. The serial controller is connected to PCI bus 239. The serial controller is also coupled to a serial hub controller 303, which is coupled to the PCI bus and a second ACM. In a specific embodiment, a receptacle board 310 is added to connect to the second ACM. The purpose of the receptacle board is to allow a cable connection 307 to the peripheral board 300. The cable connection is possible because the signals needed to connect to the peripheral board can be limited to video, I/O, serial communication, and power. The serial communication controller can be placed on the receptacle board and not in the ACM. As shown, the serial bus controller couples to the PCI bus. The receptacle board also couples to power, graphics subsystem, I/O controller, and other elements, which may be on a common bus. The overall operation of the present configuration is similar to the previous one except it operates in serial communication mode.

The Dual ACM system can support different usage models:

1. One user using both ACMs concurrently with 1 or 2 monitors, and a common keyboard/mouse.

2. Two users using the two separate ACMs at the same time with separate monitors and keyboard/mouse. The 2 users share peripherals, e.g., printer, CDROM, and others. The two users share external networking.

To support 1 monitor for both ACMs, a video switch in the peripheral console is used to switch between the video outputs of the two ACMs. The system can be set to support either 1 monitor or 2-monitor mode. The user presses a special key on the keyboard or a special icon on the screen to switch the screen display from one ACM to the other. This same action causes the keyboard and mouse connections to switch from one ACM to the other ACM.

A dual ACM system can save space, wiring, and cost for a 2-person PC setup, with the added benefit that both PC systems can be accessed from one user site for increased system performance if the other user is not using the system. Files can be copied between the primary drive of both system and provides protection against a single ACM failure. Software needs to be developed to manage the concurrent use of two PC subsystems, the automatic sharing of selected files between the two systems, and fault tolerance.

The design with more than two computer modules can be implemented with the use of multi-port, serial communication hub controller and multi-port I/O switches. In one embodiment, a peripheral console has four computer bays for four separate computer modules. The computer modules communicate through a four port Ethernet hub. The video, keyboard, and mouse switch will cycle through the connection from each computer module to the external monitor, keyboard, and mouse with a push button sequentially. This embodiment is useful for a server that performs different functions concurrently, e.g. email, application hosting, web hosting, firewall, etc.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 4:
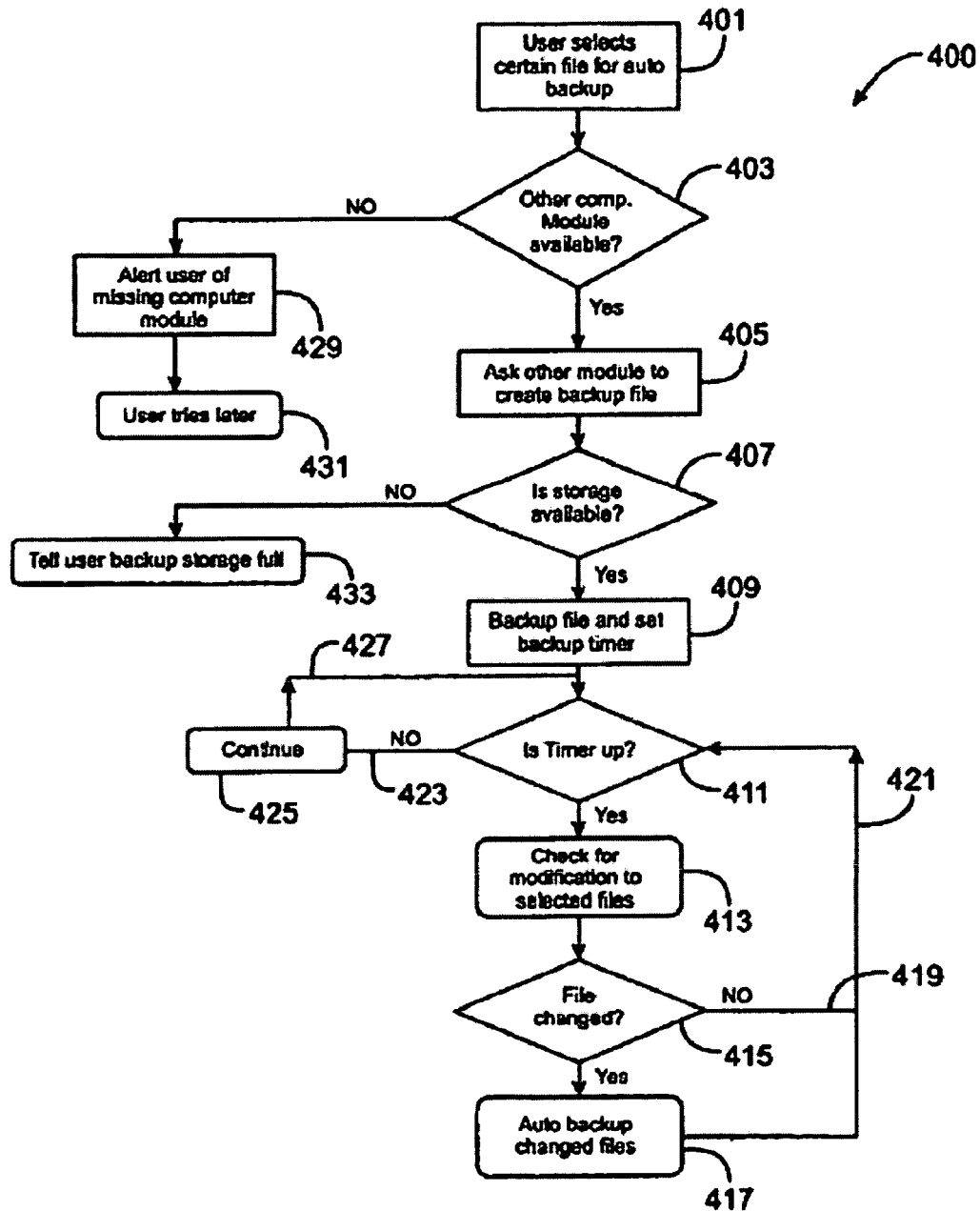
FIG. 4 is a simplified flow diagram of a method according to an embodiment of the present invention.

FIG. 4 is a simplified diagram of a method according to an embodiment of the present invention. This diagram is merely an example which should not limit the scope of the claims herein. One of ordinary skill in the art would recognize many other variations, modifications, and alternatives. The present diagram illustrates an automatic file backup procedure from one computer module to the other. As shown, a user selects (step 401) a certain file in one of the computer module for automatic backup. Next, the method determines if another module is available, step 403. If so, the method in the originating module requests the other computer module to create (step 405) backup file. Alternatively, the method alerts the user of the missing or malfunctioning module, step 429. The method then has the user try later 431, once the missing or malfunctioning module has been replaced or repaired. Next, the method determines if there is sufficient storage available in the other computer module for the backup files. If so, the method goes to the next step. (Alternatively, the method prompts (step 433) a message to the user indicating that the storage is full.) In the next step, the method stores the backup file in memory of the other module. After the backup file has been successfully created (step 409), the software in the originating ACM sets a timer to check (step 411) for file modification via branches 423, 427 through continue, step 425 process. If a file selected for backup has been modified (step 415), then the file is automatically back up to the other ACM again, step 417. Alternatively, the method returns to step 411 through branch 421.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 5:
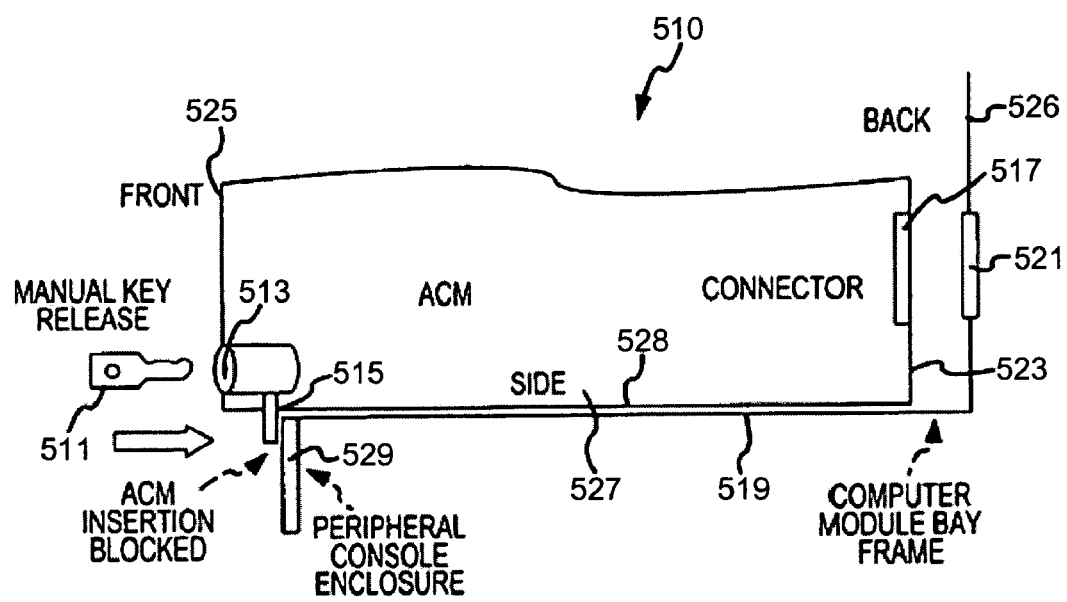
FIG. 5 is a simplified side-view diagram of a computer module according to an embodiment of the present invention.

FIG. 5 is a simplified side-view diagram of a computer module according to an embodiment of the present invention. This diagram is merely an illustration and should not limit the scope of the claims herein. One of ordinary skill in the art would recognize other variations, modifications, and alternatives. Some of the reference numerals are similar to the previous FIG. for easy reading. As shown, the ACM module inserts into the computer module bay frame 519, which is in the console. A side 527 and a bottom 519 of ACM slide and fit firmly into the computer module bay frame, which has at least a bottom portion 519 and back portion 526. A backside 523 of the ACM faces backside 526 of the frame. ACM also has a front-side or face 525 that houses the lock and exposes the keyhole 513 to a user. The key 511 is insertable from the face into the keyhole.

As the ACM inserts into the frame, connector 517 couples and inserts into connector 521. Connector 517 electrically and mechanically interface elements of the ACM to the console through connector 521. Latch 514 should be moved away from the bottom side 519 of the module bay frame before inserting the ACM into the frame. Once the ACM is inserted fully into the frame, latch 515 is placed in a closed or lock position, where it keeps the ACM firmly in place. That is, latch 515 biases against a backside portion 529 of the ACM enclosure to hold the ACM in place, where the connector 517 firmly engages, electrically and mechanically, with connector 521. To remove the ACM, latch 515 is moved away or opened from the back side portion of the ACM enclosure. ACM is manually pulled out of the computer module bay frame, where connector 517 disengages with connector 521. As shown, the key 511 is used to selectively move the latch in the open or locked position to secure the ACM into the frame module.

In most embodiments, the ACM includes an enclosure such as the one described with the following components, which should not be limiting:
1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present security system are described in more detail below.

Figure 6:
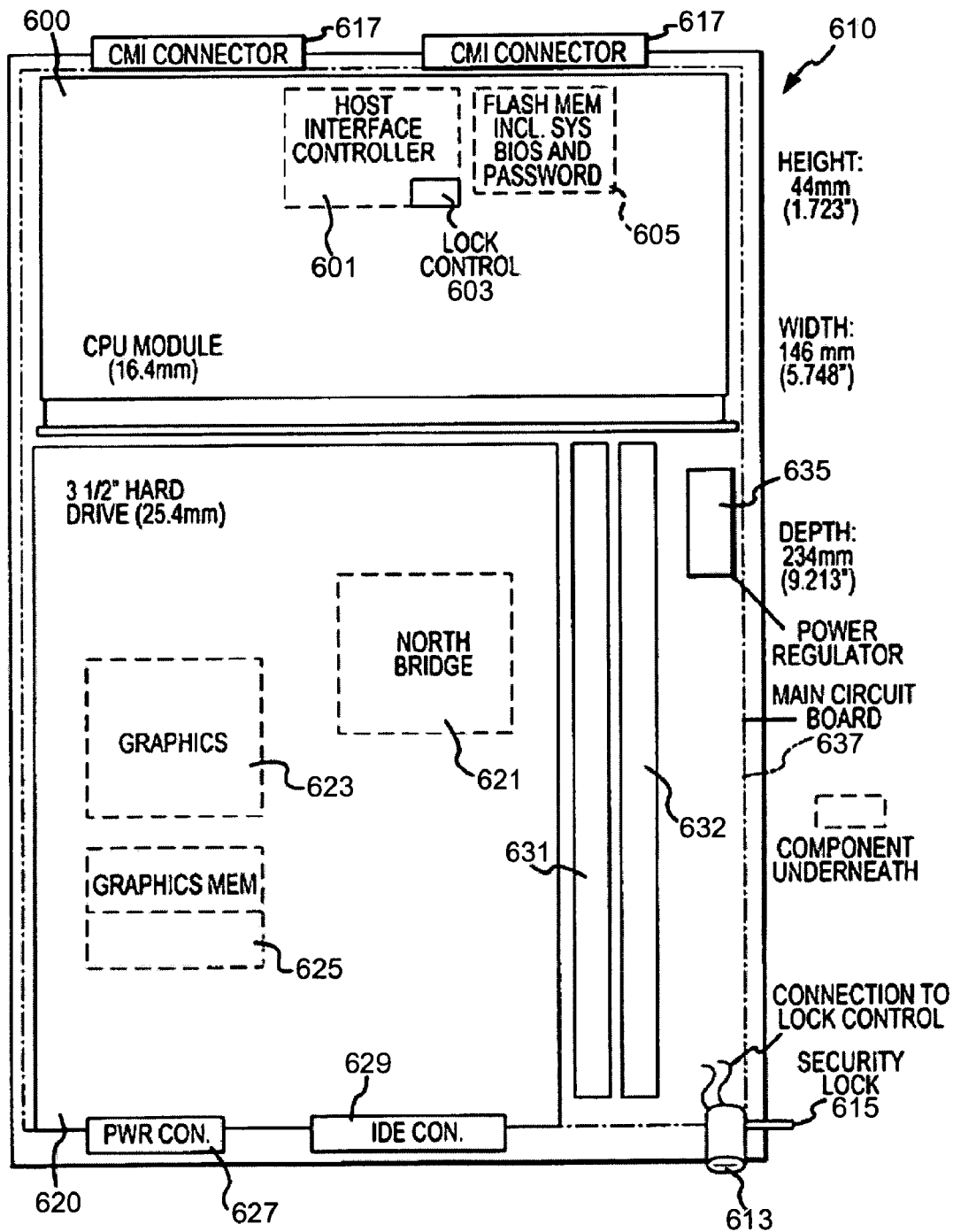
FIG. 6 is a simplified layout diagram of a security system for a computer system according to an embodiment of the present invention.

FIG. 6 is a simplified layout diagram of a security system for a computer system according to an embodiment of the present invention. This diagram is merely an illustration and should not limit the scope of the claims herein. One of ordinary skill in the art would recognize other variations, modifications, and alternatives. The layout diagram illustrates the top-view of the module 610, where the backside components (e.g., Host Interface Controller) are depicted in dashed lines. The layout diagram has a first portion, which includes a central processing unit ("CPU") module 600, and a second portion, which includes a hard drive module 620. A common printed circuit board 637 houses these modules and the like. Among other features, the ACM includes the central processing unit module 600 with a cache memory 605, which is coupled to a north bridge unit 621, and a host interface controller 601. The host interface controller includes a lock control 603. As shown, the CPU module is disposed on a first portion of the attached computer module, and couples to connectors 617. Here, the CPU module is spatially located near connector 617.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, host interface controller 601 is coupled to BIOS/flash memory 605. Additionally, the host interface controller is coupled to a clock control logic, a configuration signal, and a peripheral bus. The present invention has a host interface controller that has lock control 603 to provide security features to the present ACM. Furthermore, the present invention uses a flash memory that includes codes to provide password protection or other electronic security methods.

The second portion of the attached computer module has the hard drive module 620. Among other elements, the hard drive module includes north bridge 621, graphics accelerator 623, graphics memory 625, a power controller 627, an IDE controller 629, and other components. Adjacent to and in parallel alignment with the hard drive module is a personal computer interface ("PCI") bus 631, 632. A power regulator 635 is disposed near the PCI bus.

In a specific embodiment, north bridge unit 621 often couples to a computer memory, to the graphics accelerator 623, to the IDE controller, and to the host interface controller via the PCI bus. Graphics accelerator 623 typically couples to a graphics memory 623, and other elements. IDE controller 629 generally supports and provides timing signals necessary for the IDE bus. In the present embodiment, the IDE controller is embodied as a 643U2 PCI-to IDE chip from CMD Technology, for example. Other types of buses than IDE are contemplated, for example EIDE, SCSI, 1394, and the like in alternative embodiments of the present invention.

The hard drive module or mass storage unit 620 typically includes a computer operating system, application software program files, data files, and the like. In a specific embodiment, the computer operating system may be the Windows 98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 620 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE. Among other features, the computer system includes an ACM with security protection. The ACM connects to the console, which has at least the following elements, which should not be limiting.

1) Connection to input devices, e.g. keyboard or mouse;
2) Connection to display devices, e.g. Monitor;
3) Add-on means, e.g. PCI add-on slots;
4) Removable storage media subsystem, e.g. Floppy drive, CDROM drive;
5) Communication device, e.g. LAN or modem;
6) An interface device and connectors to ACM;
7) A computer module bay with a notch in the frame for ACM's lock; and
8) Power supply and other accessories.

As noted, the computer module bay is an opening in a peripheral console that receives the ACM. The computer module bay provides mechanical support and protection to ACM. The module bay also includes, among other elements, a variety of thermal components for heat dissipation, a frame that provides connector alignment, and a lock engagement, which secures the ACM to the console. The bay also has a printed circuit board to mount and mate the connector from the ACM to the console. The connector provides an interface between the ACM and other accessories.

Figure 7:
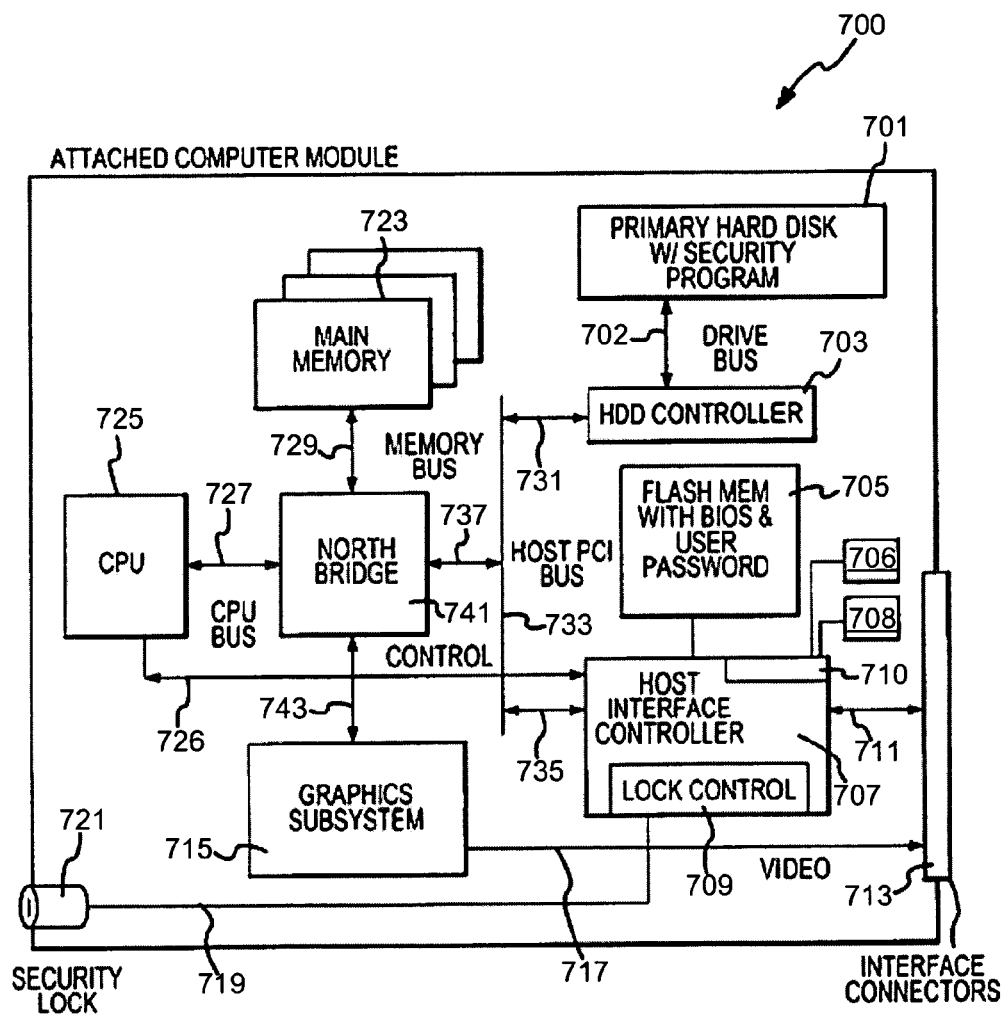
FIG. 7 or 7A area simplified block diagrams of a security system for a computer module according to an embodiment of the present invention.

FIG. 7 is a simplified block diagram 700 of a security system for a computer module according to an embodiment of the present invention. This diagram is merely an illustration and should not limit the scope of the claims herein. One of ordinary skill in the art would recognize other variations, modifications, and alternatives. The block diagram 700 has a variety of features such as those noted above, as well as others. In the present diagram, different reference numerals are used to show the operation of the present system.

The block diagram is an attached computer module 700. The module 700 has a central processing unit, which communicates to a north bridge 741, by way of a CPU bus 727. The north bridge couples to main memory 723 via memory bus 729. The main memory can be any suitable high speed memory device or devices such as dynamic random access memory ("DRAM") integrated circuits and others. The DRAM includes at least 32 Meg. or 64 Meg. and greater of memory, but can also be less depending upon the application. Alternatively, the main memory can be coupled directly with the CPU in some embodiments. The north bridge also couples to a graphics subsystem 715 via bus 742. The graphics subsystem can include a graphics accelerator, graphics memory, and other devices. Graphics subsystem transmits a video signal to an interface connector, which couples to a display, for example.

The attached computer module also includes a primary hard disk drive that serves as a main memory unit for programs and the like. The hard disk can be any suitable drive that has at least 2 GB and greater. As merely an example, the hard disk is a Marathon 2250 (2.25 GB, 2½ inch drive) product made by Seagate Corporation of Scotts Valley, but can be others. The hard disk communicates to the north bridge by way of a hard disk drive controller and bus lines 702 and 731. The hard disk drive controller couples to the north bridge by way of the host PCI bus, which connects bus 737 to the north bridge. The hard disk includes computer codes that implement a security program according to the present invention. Details of the security program are provided below.

The attached computer module also has a flash memory device 705 with a BIOS. The flash memory device 705 also has codes for a user password that can be stored in the device. The flash memory device generally permits the storage of such password without a substantial use of power, even when disconnected. As merely an example, the flash memory device has at least 4 Meg. or greater of memory, or 16 Meg. or greater of memory. A host interface controller 707 communications to the north bridge via bus 735 and host PCI bus. The host interface controller also has a lock control 709, which couples to a lock. The lock is attached to the module and has a manual override to the lock on the host interface controller in some embodiments. Host interface controller 707 communicates to the console using bus 711, which couples to connection 713.

Figure 7A:
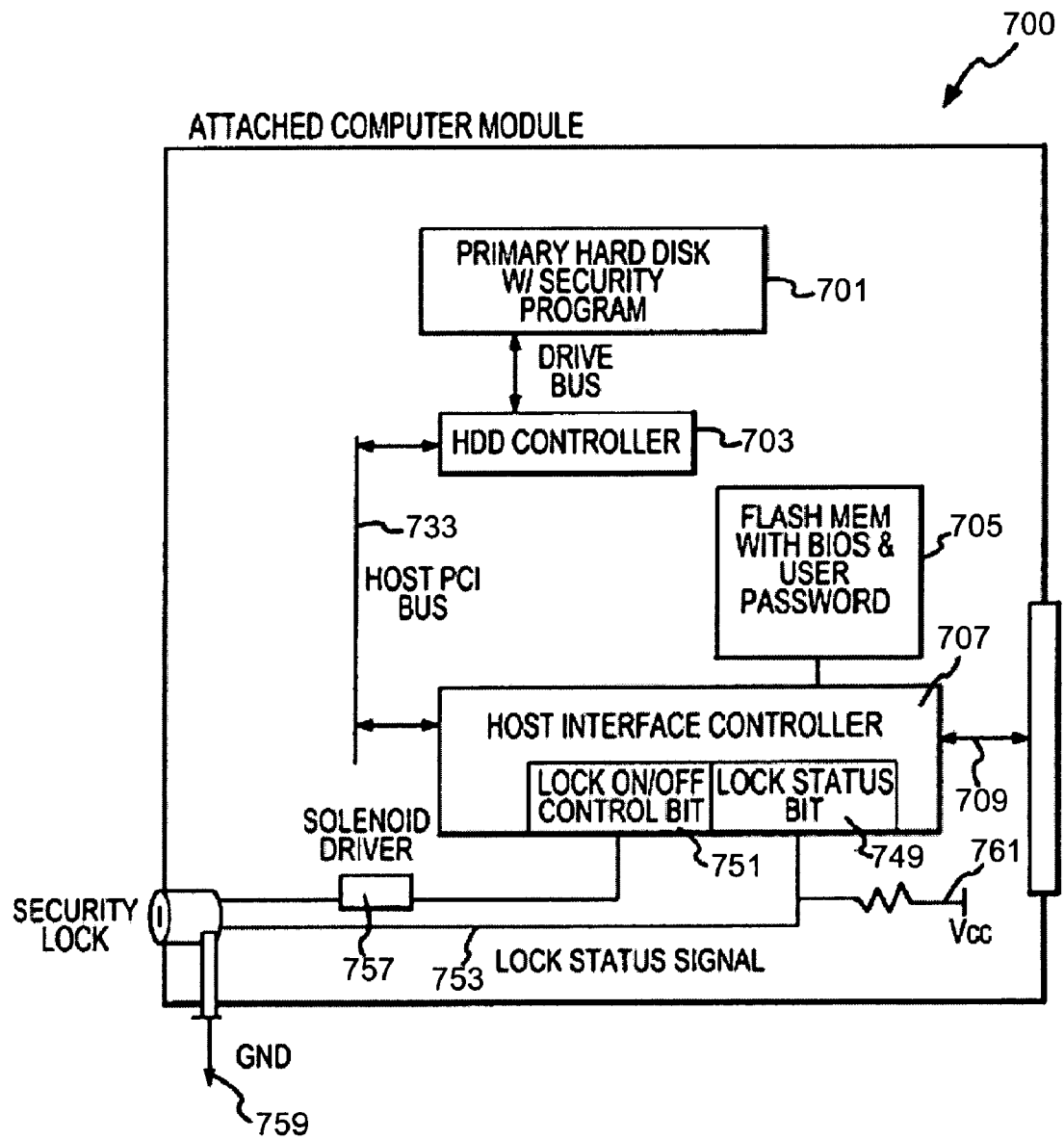

In one aspect of the present invention the security system uses a combination of electrical and mechanical locking mechanisms. Referring to FIG. 7A, for example, the present system provides a lock status mechanism in the host interface controller 709. The lock status of the lock is determined by checking a lock status bit 749, which is in the host interface controller. The lock status bit is determined by a signal 753, which is dependent upon the position of the lock. Here, the position of the lock is closed in the ground 759 position, where the latch couples to a ground plane in the module and/or system. Alternatively, the signal of the lock is at Vcc, for example, which is open. Alternatively, the signal can be ground in the open position and Vcc in the closed position, depending upon the application. Other signal schemes can also be used depending upon the application.

Once the status is determined, the host interface controller turns the lock via solenoid 757 in a lock on or lock off position, which is provided through the control bit 751, for example. The control bit is in a register of the host interface controller in the present example. By way of the signal schemes noted and the control bit, it is possible to place the lock in the lock or unlock position in an electronic manner. Once the status of the lock is determined, the host interface controller can either lock or unlock the latch on the module using a variety of prompts, for example.

In a preferred embodiment, the present invention uses a password protection scheme to electronically prevent unauthorized access to the computer module. The present password protection scheme uses a combination of software, which is a portion of the security program, and a user password, which can be stored in the flash memory device 705. By way of the flash memory device, the password does not become erased by way of power failure or the lock. The password is substantially fixed in code, which cannot be easily erased. Should the user desire to change the password, it can readily be changed by erasing the code, which is stored in flash memory and a new code (i.e., password) is written into the flash memory. An example of a flash memory device can include a Intel Flash 28F800F3 series flash, which is available in 8 Mbit and 16 Mbit designs. Other types of flash devices can also be used, however. Details of a password protection method are further explained below by way of the FIG.

In a specific embodiment, the present invention also includes a real-time clock 710 in the ACM, but is not limited. The real-time clock can be implemented using a reference oscillator 14.31818 MHz 708 that couples to a real-time clock circuit. The real-time clock circuit can be in the host interface controller. An energy source 706 such as a battery can be used to keep the real-time clock circuit running even when the ACM has been removed from the console. The real-time clock can be used by a security program to perform a variety of functions. As merely an example, these functions include: (1) fixed time period in which the ACM can be used, e.g., ACM cannot be used at night; (2) programmed ACM to be used after certain date, e.g., high security procedure during owner's vacation or non use period; (3) other uses similar to a programmable time lock. Further details of the present real-time clock are described in the application listed under Ser. No. 09/183,816 noted above.

In still a further embodiment, the present invention also includes a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present password and user identification can be quite important for electronic commerce applications and the like. In one or more embodiments, the permanent password or user code can be combined with the password on flash memory for the security program.

In one aspect of the invention, the user password is programmable. The password can be programmable by way of the security program. The password can be stored in a flash memory device within the ACM. Accordingly, the user of the ACM and the console would need to have the user password in order to access the ACM. In the present aspect, the combination of a security program and user password can provide the user a wide variety of security functions as follows:

1) Auto-lock capability when ACM is inserted into CMB;
2) Access privilege of program and data;
3) Password matching for ACM removal; and
4) Automatic HDD lock out if tampering is detected.

In still a further embodiment, the present invention also includes a method for reading a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present method allows a third party confirm the user by way of the permanent password or user code. The present password and user identification can be quite important for electronic commerce applications and the like, which verify the user code or password. In one or more embodiments, the permanent password or user code can be combined with the password on flash memory for the security program.

An embodiment of a computer module in accordance with the present invention, comprises, an enclosure, said enclosure being insertable into a console; a central processing unit in said enclosure, said central processing unit comprising a microprocessor based integrated circuit chip; a hard disk drive in said enclosure, said hard disk drive being coupled to said central processing unit; and a programmable memory device in said enclosure, said programmable memory device being configurable to store a password for preventing a possibility of unauthorized use of said hard disk drive.

In accordance with an alternative embodiment, the computer module may further comprise a host interface controller for providing a status of a locking device in said enclosure.

In accordance with an alternative embodiment, the computer module may further comprise a mechanical locking device that is coupled to said programmable memory device.

In accordance with an alternative embodiment, the computer module may further comprise a host interface controller coupled to a mechanical locking device, said host interface controller being coupled to said programmable memory device.

In accordance with an alternative embodiment, the programmable memory device may further comprise a flash memory device.

In accordance with an alternative embodiment, the programmable memory device may further comprise a flash memory device having at least 8 Mbits of cells and greater.

In accordance with an alternative embodiment, the computer module may further comprise a security program in a main memory.

In accordance with an alternative embodiment, the security program may comprise a code for storing a password on said programmable memory device.

In accordance with an alternative embodiment, the security program may comprise a code for checking a time from said real-time clock circuit.

In accordance with an alternative embodiment, the computer module may further comprise a host interface controller coupled to a solenoid that drives a mechanical lock in a first position to a second position. In accordance with an alternative embodiment, the solenoid also drives said mechanical lock from said second position to said first position.

In accordance with an alternative embodiment, the computer module may further comprise a real-time clock circuit coupled to said central processing unit.

In accordance with an alternative embodiment, the computer module may further comprise a battery coupled to a host interface controller that includes said real-time clock.

An embodiment of a method in accordance with the present invention for operating a computer system, comprises, inserting an attached computer module ("ACM") into a bay of a modular computer system, said ACM comprising a microprocessor unit coupled to a mass memory storage device; applying power to said computer system and said ACM to execute a security program, said security program being stored in said mass memory storage device; and prompting for a user password from a user on a display.

In accordance with an alternative embodiment, the ACM may comprise an enclosure that houses said microprocessor unit and said mass memory storage device.

In accordance with an alternative embodiment, a user password may be provided to said security program.

In accordance with an alternative embodiment, a flash memory device may store a desired password for said ACM.

In accordance with an alternative embodiment, the flash memory device maintains said desired password when power is removed from said ACM.

In accordance with an alternative embodiment, the flash memory device is coupled to a host interface controller that is coupled to the microprocessor based unit.

In accordance with an alternative embodiment, the mass memory storage device comprises a code directed to comparing said user password with a desired password.

In accordance with an alternative embodiment, the method further comprises identifying a permanent password or user code on said attached computer module.

In accordance with an alternative embodiment, the method wherein the permanent password or user code is stored in the microprocessor unit.

In accordance with an alternative embodiment, the method wherein the permanent password or user code is stored in a flash memory device coupled to the microprocessor unit.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A computer system comprising:
a console comprising a power supply, a first coupling site and a second coupling site, each coupling site comprising a connector and a slot, the console being a first enclosure housing the coupling sites,
a serial communication controller powered by the power supply, and
a plurality of computer modules; each computer module coupled to one of the coupling site through the connector and the slot, comprising
a second enclosure,
a processing unit,
a main memory coupled to the processing unit,
a graphics controller, and
a flash memory device being configurable to store a password for preventing unauthorized access to the computer module;
wherein each of the computer modules is substantially similar in design to each other and operates fully independent of each other.

2. The computer system of claim 1 wherein each computer module further comprises a communication controller coupled to the serial communication controller in the console adapted to transfer data between any two of the computer modules and to an external network.

3. The computer system of claim 1 wherein the computer module further comprises a mass storage unit storing a security program.

4. The computer system of claim 1 wherein the console further comprises a video switch coupled to the graphics controller of the computer module.

5. The computer system of claim 1 wherein the computer module further comprises an interface controller that communicates to the console.

6. A computer system comprising:
a console comprising a power supply, a first coupling site and a second coupling site, each coupling site comprising a connector and a slot, the console being an enclosure housing the coupling sites,
an Ethernet controller coupled to an external network and powered by the power supply, and
a plurality of computer modules; each computer module coupled to one of the coupling site through the connector and the slot, comprising
a processing unit,
a main memory coupled to the processing unit,
a flash memory device being configurable to store a password for preventing unauthorized access to the computer module, and a network controller coupled to the Ethernet controller through the connector of the coupling site, wherein each of the computer modules is substantially similar in design to each other, and wherein one of the computer modules is configured to provide protection against failure of another of the computer modules.

7. The computer system of claim 6 wherein the computer module further comprises a mass storage unit storing a security program.

8. The computer system of claim 6 wherein the console further comprises a video switch coupled to the graphics controller of the computer module.

9. The computer system of claim 6 wherein the flash memory device further comprises codes to provide password protection for the computer module.

10. The computer system of claim 6 wherein the Ethernet controller adapted to transfer data between any two of the computer modules and to the external network.

11. A computer system comprising:

a console comprising an Ethernet hub controller, a first coupling site and a second coupling site, each coupling site comprising a connector and a slot, the console being a first enclosure housing the Ethernet hub controller, each coupling site, and a plurality of computer modules, each coupled to one of the coupling sites through the connector and the slot; each computer module comprising a second enclosure, a processing unit, a graphics subsystem, a main memory coupled to the processing unit, a flash memory device being configurable to store a password for preventing unauthorized access to the computer module, and an Ethernet controller coupled to the Ethernet hub controller through the connector of the coupling site for communication between the computer modules;

and wherein each of the computer modules operates fully independent of each other.

12. The computer system of claim 11 wherein the computer module further comprises a mass storage unit storing a security program.

13. The computer system of claim 11 wherein the console further comprises a video switch coupled to the graphics controller of the computer module.

14. The computer system of claim 11 wherein the flash memory device further comprises codes to provide password protection for the computer module.

15. The computer system of claim 11 wherein the Ethernet controller adapted to transfer data between any two of the computer modules and to the external network.

16. A computer system comprising:

a console comprising a power supply, a first coupling site and a second coupling site, each coupling site comprising a connector and a slot, the console being an enclosure housing the coupling sites, a serial communication controller powered by the power supply, and a plurality of computer modules; each computer module coupled to one of the coupling site through the connector and the slot, comprising a processing unit, a main memory coupled to the processing unit, a communication controller coupled to the serial communication controller through the connector of the coupling site, and a flash memory device being configurable to store a password for preventing unauthorized access to the computer module;

wherein each of the computer modules operates fully independent of each other, and wherein one of the computer modules can replace another one of the computer modules in operation.

17. The computer system of claim 16 wherein the computer module further comprises a mass storage unit storing a security program.

18. The computer system of claim 16 wherein the console further comprises a video switch coupled to the graphics controller of the computer module.

19. The computer system of claim 16 further comprises a hard disk drive coupled to the computer module.

20. The computer system of claim 16 wherein the flash memory device further comprises codes to provide password protection for the computer module.

21. A computer system comprising:

a console comprising a video switch, a first coupling site and a second coupling site, each coupling site comprising a connector and a slot; the console being an enclosure housing the video switch, each coupling site, an Ethernet controller coupled to an external network, and a plurality of computer modules; each computer module coupled to one of the coupling sites through the connector and the slot, and comprising a processing unit, a main memory coupled to the processing unit, a graphics controller coupled to the video switch, and a mass storage device with a security program;

wherein each of the computer modules operates fully independent of each other;

and wherein the security program provides password protection of the computer module.

22. The computer system of claim 21 wherein each computer module further comprises a network controller coupled to the Ethernet controller in the console adapted to transfer data between any two of the computer modules and to an external network.

23. The computer system of claim 21 wherein the computer module further comprises an enclosure.

24. The computer system of claim 21 wherein the computer module further comprises a flash memory device being configurable to store a password for preventing unauthorized access to the computer module.

25. The computer system of claim 21 wherein the computer module further comprises a permanent password or user identification to identify the computer module.

26. A computer system comprising:

a console comprising an Ethernet hub controller, a first coupling site and a second coupling site, each coupling site comprising a connector and a slot, the console being an enclosure housing the Ethernet hub controller, each coupling site, and a plurality of computer modules, each coupled to one of the coupling sites through the connector and the slot; each computer module comprising a processing unit, a graphics controller, a main memory coupled to the processing unit, a SCSI hard disk drive with a security program, and an Ethernet controller coupled to the Ethernet hub controller through the connector of the coupling site for communication between the computer modules;

wherein each of the computer modules operates independent of each other, and wherein one of the computer modules can replace another one of the computer modules in operation.

27. The computer system of claim 26 wherein the security program provides password protection of the computer module.

28. The computer system of claim 26 wherein the SCSI hard disk drive is removable while the computer module is in operation.

29. The computer system of claim 26 wherein the console further comprises a video switch coupled to the video output of the computer module.

30. The computer system of claim 26 wherein the computer module further comprises a permanent password or user identification to identify the computer module.

31. A computer system comprising:
a console comprising a first coupling site, and a second coupling site, each coupling site comprising a connector and a slot; the console being an enclosure housing each coupling site,
an Ethernet hub controller, and
a plurality of computer modules; each computer module coupled to the coupling site through the connector and the slot, and comprising
a processing unit,
a main memory coupled to the processing unit,
a graphics controller,
an Ethernet controller coupled to the Ethernet hub controller through the connector of the coupling site for communication between the computer modules,
a hard disk drive, and
a security program in combination with a password is configured to provide lock out of the hard disk drive;
wherein each of the computer modules is substantially similar in design to each other, and wherein one of the computer modules can provide protection against failure of another one of the computer modules.

32. The computer system of claim 31 wherein the computer module further comprises a flash memory device being configurable to store a password for preventing unauthorized access to the computer module.

33. The computer system of claim 31 wherein the hard disk drive is removable while the computer module is in operation.

34. The computer system of claim 31 wherein the console further comprises a video switch coupled to the video output of the computer module.

35. The computer system of claim 31 wherein the computer module further comprises a permanent password or user identification to identify the computer module.

36. A computer system comprising:
a console comprising an Ethernet controller coupled to an external network, a keyboard/mouse multi-port switch, a first coupling site and a second coupling site, each coupling site comprising a connector and a slot, the console being an enclosure housing the Ethernet controller, each coupling site, and
a plurality of computer modules, each coupled to one of the coupling sites through the connector and the slot; each computer module comprising
a processing unit,
a main memory coupled to the processing unit,
a security program to provide password protection for the computer module, and
a network controller coupled to the Ethernet controller through the connector of the coupling site for communication between the computer modules;
wherein each of the computer modules operates fully independent of each other; and wherein the keyboard/mouse multi-port switch switches between keyboard/mouse connection of the computer modules based on a command from a user.

37. The computer system of claim 36 wherein the computer module further comprises a flash memory device being configurable to store a password for preventing unauthorized access to the computer module.

38. The computer system of claim 36 wherein the computer module further comprises a mass storage unit storing the security program.

39. The computer system of claim 36 wherein the computer module further comprises a permanent password or user identification to identify the computer module.

40. The computer system of claim 36 wherein the command from the user is in the form of either a key on the keyboard or an icon on the screen that the mouse can click on.

41. A computer system comprising:
a console comprising a first coupling site, a second coupling site, each coupling site comprising a connector, the console being an enclosure that is capable of housing each coupling site,
a serial communication hub controller coupled to an external network, and
a plurality of computer modules inserted into said console; each computer module coupled to one of the connectors of the console and comprising,
a processing unit,
a communication controller coupled to the serial communication hub controller through the connector of the coupling site to support communication with the other modules,
a main memory coupled to the processing unit,
a permanent password or identification code for allowing data access of the computer module, and
a graphics controller coupled to the processing unit;
wherein each of the computer modules provide independent processing in the computer system; and wherein one of the computer modules is configured to provide protection against failure of another of the plurality of computer modules.

42. The computer system of claim 41 wherein the computer module further comprises a flash memory device being configurable to store a password for preventing unauthorized access to the computer module.

43. The computer system of claim 41 wherein the computer module further comprises a mass storage unit storing a security program.

44. The computer system of claim 41 wherein the console further comprises a video switch coupled to the video output of the computer module.

45. The computer system of claim 41 wherein the permanent password is stored in the central processing unit.

46. A computer system comprising:
a console comprising an Ethernet hub controller, a first coupling site and a second coupling site, each coupling site comprising a connector and a slot, the console being an enclosure housing the Ethernet hub controller, the coupling sites, and
a plurality of computer modules, each coupled to one of the coupling sites through the connector and the slot; each computer module comprising a processing unit, a main memory coupled to the processing unit, a permanent password or identification code for allowing data access of the computer module, and an Ethernet controller coupled to the Ethernet hub controller through the connector of the coupling site for communication to another computer module;

wherein each of the computer modules operates fully independent of each other.

47. The computer system of claim 46 wherein the computer module further comprises a flash memory device being configurable to store a password for preventing unauthorized access to the computer module.

48. The computer system of claim 46 wherein the enclosure houses a hard disk drive coupled to the computer module.

49. The computer system of claim 46 wherein the computer module further comprises a mass storage unit storing a security program.

50. The computer system of claim 46 wherein the permanent password is stored in the central processing unit.

51. A method for operating a computer system, said method comprising:

inserting a computer module into a coupling site of a console comprising an Ethernet controller, a first coupling site, and a second coupling site, each coupling site comprising a connector and a slot;

the computer module comprising an enclosure, a processing unit coupled to a mass storage device, and a network controller coupled to the Ethernet controller through the connector of the coupling site;

inserting a second computer module into a coupling site of the console;

applying power to said computer module to execute a security program, said security program being stored in said mass storage device; and prompting for a user password from a user on a display coupled to the console; and wherein said user password has to be electrically communicated to the computer module from the console, wherein each of the computer modules operates fully independent of each other.

52. The method of claim 51 further comprises providing the user password to the security program for controlling access to the data in the mass storage device.

53. The method of claim 51 further comprises sending the user password through a keyboard switch in the console.

54. The method of claim 51 further comprises locking out the mass storage device if tampering is detected.

55. A method for operating a computer system, said method comprising:

providing a console comprising an Ethernet hub controller, a first coupling site, and a second coupling site, each coupling site comprising a connector and a slot;

inserting a first computer module into the first coupling site of the console; said computer module comprising a microprocessor unit coupled to a mass memory storage device;

applying power to said computer module to execute a security program, said security program being stored in said mass storage device; and prompting for a user password from a user on a display coupled to the console;

sending the user password to the security program for access control to the computer module;

inserting a second computer module into the second coupling site of the console; the second computer module is substantially similar in design to the first computer module;

providing communication between the computer modules through the Ethernet hub controller;

wherein the computer modules operate fully independent of each other; and one of the computer modules can be configured to provide protection against failure of the other computer module.

56. The method of claim 55 further comprises providing the user password to the security program for controlling access to the data in the mass storage device.

57. The method of claim 55 further comprises sending the user password through a keyboard switch in the console.

58. The method of claim 55 further comprises locking out the mass storage device if tampering is detected.

59. The method of claim 55 further comprises providing a permanent password or user identification code to identify the computer module.

60. A method for operating a computer system, said method comprising:

providing a console comprising an serial communication controller coupled to an external network, a first coupling site, and a second coupling site, each coupling site comprising a connector and a slot;

inserting a first computer module into the first coupling site of the console; said computer module comprising a microprocessor unit coupled to a mass memory storage device;

applying power to said computer module to execute a security program, said security program being stored in said mass storage device; and prompting for a user password from a user on a display coupled to the console;

providing the user password to the security program for access control to the computer module;

inserting a second computer module into the second coupling site of the console; the second computer module is substantially similar in design to the first computer module;

providing communication between the computer modules through the serial communication controller and to the external network;

wherein the computer modules operate fully independent of each other; and one of the computer modules can replace another one of the computer modules in operation.

61. The method of claim 60 further comprises providing the user password to the security program for controlling access to the data in the mass storage device.

62. The method of claim 60 further comprises sending the user password through a keyboard switch in the console.

63. The method of claim 60 further comprises locking out the mass storage device if tampering is detected.

64. The method of claim 60 further comprises providing a permanent password or user identification code to identify the computer module.

65. A method for operating a computer system, said method comprising:

providing a console comprising an Ethernet controller coupled to an external network, a video switch a first coupling site, and a second coupling site, each coupling site comprising a connector and a slot;

inserting a first computer module into the first coupling site of the console; said computer module comprising a microprocessor unit coupled to a mass memory storage device;

applying power to said computer module to execute a security program, said security program being stored in said mass storage device; and prompting for a user password from a user on a display coupled to the video switch;

providing the user password to the security program for access control to the computer module;

inserting a second computer module into the second coupling site of the console; the second computer module is substantially similar in design to the first computer module;

providing communication of the computer modules to the external network through the connectors of the console and the Ethernet controller;

wherein the computer modules operate fully independent of each other.

66. The method of claim 65 further comprises providing the user password to the security program for controlling access to the data in the mass storage device.

67. The method of claim 65 further comprises sending the user password to a keyboard switch in the console.

68. The method of claim 65 further comprises locking out the mass storage device if tampering is detected.

69. The method of claim 65 further comprises providing a permanent password or user identification code to identify the computer module.

70. A method for operating a computer system, said method comprising:

inserting a computer module into a coupling site of a console comprising an Ethernet controller, a first coupling site, and a second coupling site, each coupling site comprising a connector and a slot;

the computer module comprising a processing unit, a mass storage device, a flash memory device configured to store a password for preventing unauthorized access to the computer module, and a network controller coupled to the Ethernet controller through the connector of the coupling site;

inserting a second computer module into a coupling site of the console;

applying power to said computer module; and prompting for the password from a user on a display coupled to the console;

wherein said password is electrically communicated to the computer module from the console, wherein each of the computer modules operates fully independent of each other.

71. The method of claim 70 further comprises providing the password to a security program in the computer module for controlling access to the computer module.

72. The method of claim 70 further comprises sending the user password to a keyboard switch in the console.

73. The method of claim 70 further comprises locking out the mass storage device if tampering is detected.

74. A method for operating a computer system, said method comprising:

providing a console comprising an Ethernet hub controller, a first coupling site, and a second coupling site, each coupling site comprising a connector and a slot;

inserting a first computer module into the first coupling site of the console; said computer module comprising a microprocessor unit, a security program, and a flash memory device configured to store a password for preventing unauthorized access to the computer module;

applying power to said computer module; and prompting for the password from a user on a display coupled to the console;

sending the password to the security program for access control to the computer module;

inserting a second computer module into the second coupling site of the console; the second computer module is substantially similar in design to the first computer module;

providing communication between the computer modules through the Ethernet hub controller;

wherein the computer modules operate fully independent of each other; and one of the computer modules can be configured to provide protection against failure of the other computer module.

75. The method of claim 74 further comprises storing the security program in the flash memory.

76. The method of claim 74 further comprises sending the password to a keyboard switch in the console.

77. The method of claim 74 further comprises storing the security program in a mass storage device.

78. The method of claim 74 further comprises providing a permanent password or user identification code to identify the computer module.

79. A method for operating a computer system, said method comprising:

providing a console comprising an serial communication controller coupled to an external network, a first coupling site, and a second coupling site, each coupling site comprising a connector and a slot;

inserting a first computer module into the first coupling site of the console; said computer module comprising a microprocessor unit, a security program configured to store a password for preventing unauthorized access to the computer module;

applying power to said computer module; and prompting for the password from a user on a display coupled to the console;

providing the password to the security program for access control to the computer module;

inserting a second computer module into the second coupling site of the console; the second computer module is substantially similar in design to the first computer module;

providing communication between the computer modules through the serial communication controller and to the external network;

wherein the computer modules operate fully independent of each other; and one of the computer modules can replace another one of the computer modules in operation.

80. The method of claim 79 further comprises storing the security program in the flash memory.

81. The method of claim 79 further comprises sending the password to a keyboard switch in the console.

82. The method of claim 79 further comprises storing the security program in a mass storage device.

83. The method of claim 79 further comprises providing a permanent password or user identification code to identify the computer module.

84. A method for operating a computer system, said method comprising:

providing a console comprising an Ethernet controller coupled to an external network, a video switch, a first coupling site, and a second coupling site, each coupling site comprising a connector and a slot;

inserting a first computer module into the first coupling site of the console; said computer module comprising a microprocessor unit, a security program, and a flash memory device;

applying power to said computer module to execute the security program; and prompting for the password from a user on a display coupled to the video switch;

providing the password to the security program for access control to the computer module;

inserting a second computer module into the second coupling site of the console; the second computer module is substantially similar in design to the first computer module;

providing communication of the computer modules to the external network through the connectors of the console and the Ethernet controller;

wherein the computer modules operate fully independent of each other; and one of the computer modules can replace another one of the computer modules in operation.

85. The method of claim 84 further comprises storing the security program in the flash memory.

86. The method of claim 84 further comprises sending the password to a keyboard switch in the console.

87. The method of claim 84 further comprises storing the security program in a mass storage device.

88. The method of claim 84 further comprises providing a permanent password or user identification code to identify the computer module.

* * * * *

INTER PARTES REEXAMINATION CERTIFICATE (921st)
United States Patent
Chu

(10) Number: US 7,328,297 C1
(45) Certificate Issued: *Jul. 31, 2014

(54) COMPUTER SYSTEM UTILIZING MULTIPLE COMPUTER MODULES FUNCTIONING INDEPENDENTLY

(75) Inventor: William W. Y. Chu, Los Altos, CA (US)

(73) Assignee: ACQIS LLC, McKinney, TX (US)

Reexamination Request:
No. 95/001,336, Apr. 19, 2010

Reexamination Certificate for:
| | |
|---|---|
| Patent No.: | 7,328,297 |
| Issued: | Feb. 5, 2008 |
| Appl. No.: | 11/104,169 |
| Filed: | Apr. 8, 2005 |

(*) Notice: This patent is subject to a terminal disclaimer.

Related U.S. Application Data

(63) Continuation of application No. 10/772,214, filed on Feb. 3, 2004, now Pat. No. 7,099,981, which is a continuation of application No. 09/569,758, filed on May 12, 2000, now Pat. No. 6,718,415.

(60) Provisional application No. 60/134,122, filed on May 14, 1999.

(51) Int. Cl.
*G06F 12/00* (2006.01)

(52) U.S. Cl.
USPC ........... 710/301; 709/227; 709/248; 710/313; 710/315; 710/63; 710/72

(58) Field of Classification Search
None
See application file for complete search history.

(56) References Cited

To view the complete listing of prior art documents cited during the proceeding for Reexamination Control Number 95/001,336, please refer to the USPTO's public Patent Application Information Retrieval (PAIR) system under the Display References tab.

*Primary Examiner* — Majid A. Banankhah

(57) ABSTRACT

A computer system for multi-processing purposes. The computer system has a console comprising a first coupling site and a second coupling site. Each coupling site comprises a connector. The console is an enclosure that is capable of housing each coupling site. The system also has a plurality of computer modules, where each of the computer modules is coupled to a connector. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

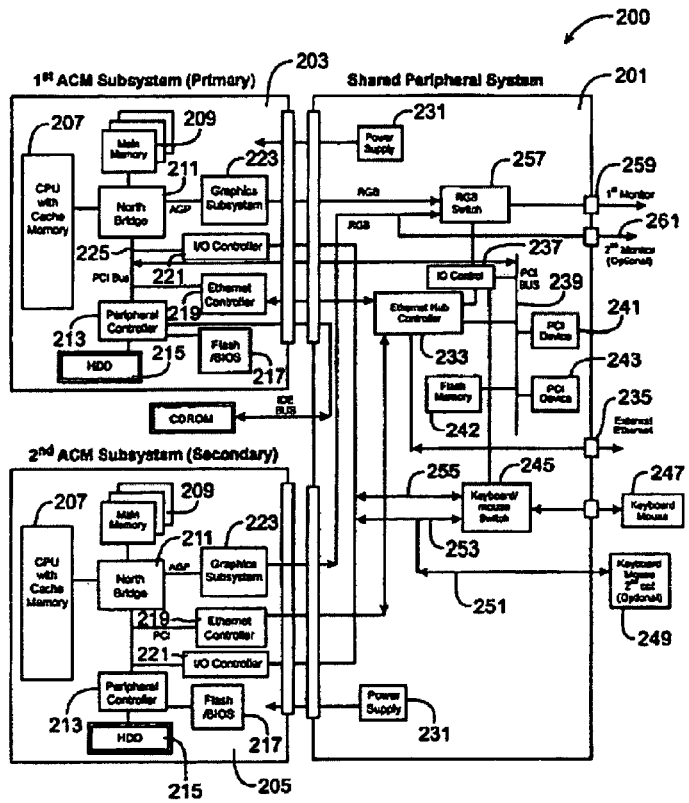

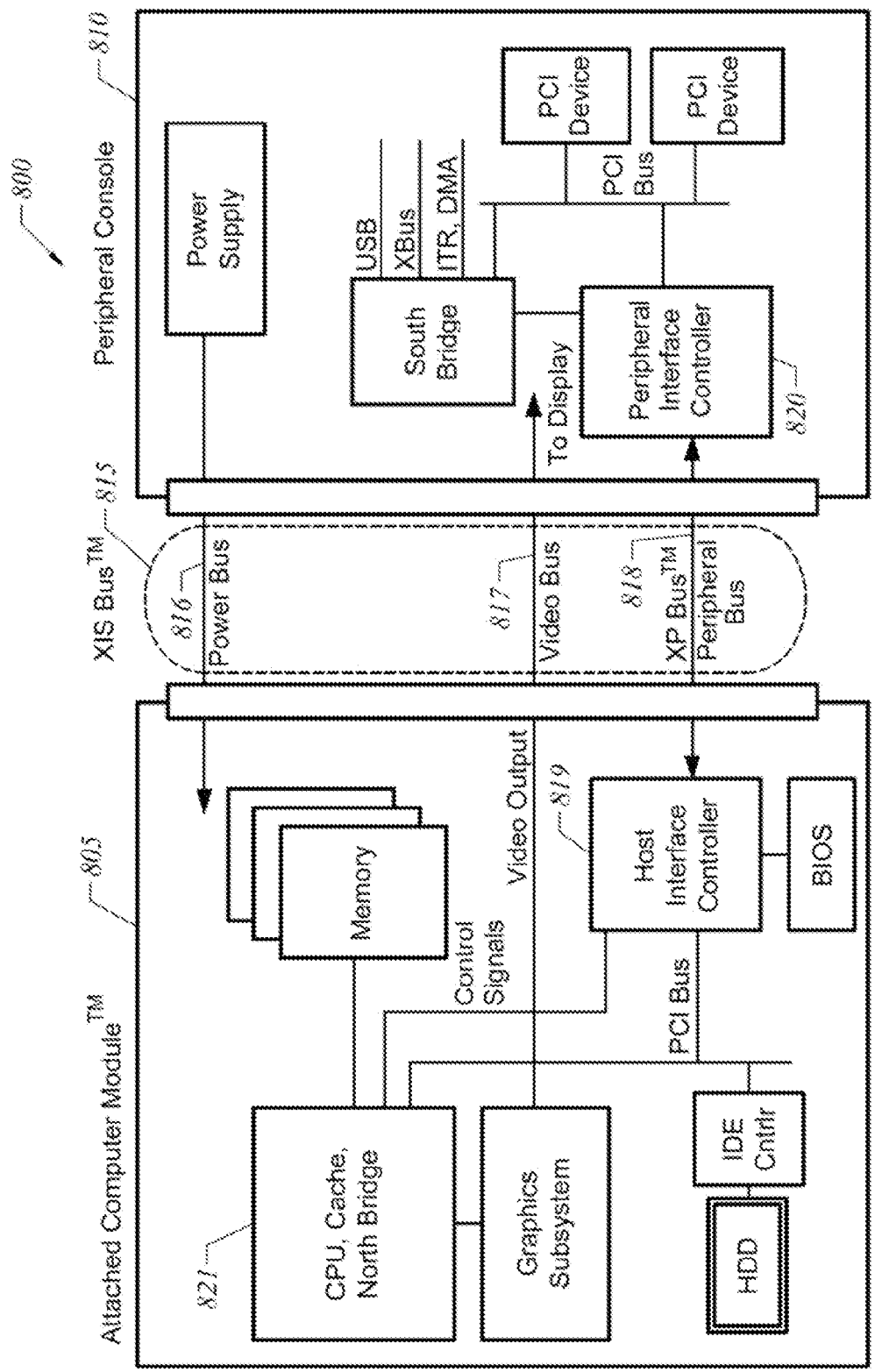
FIGURE 8
(NEW)

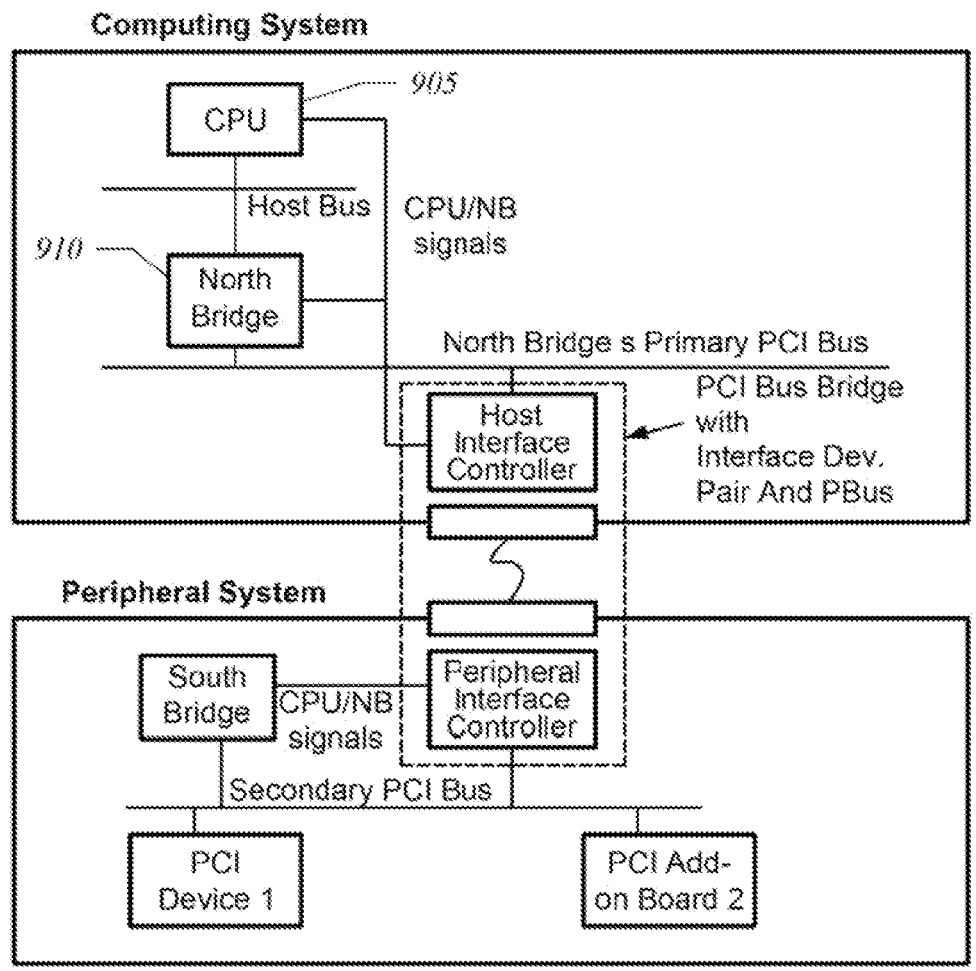
FIGURE 9
(NEW)

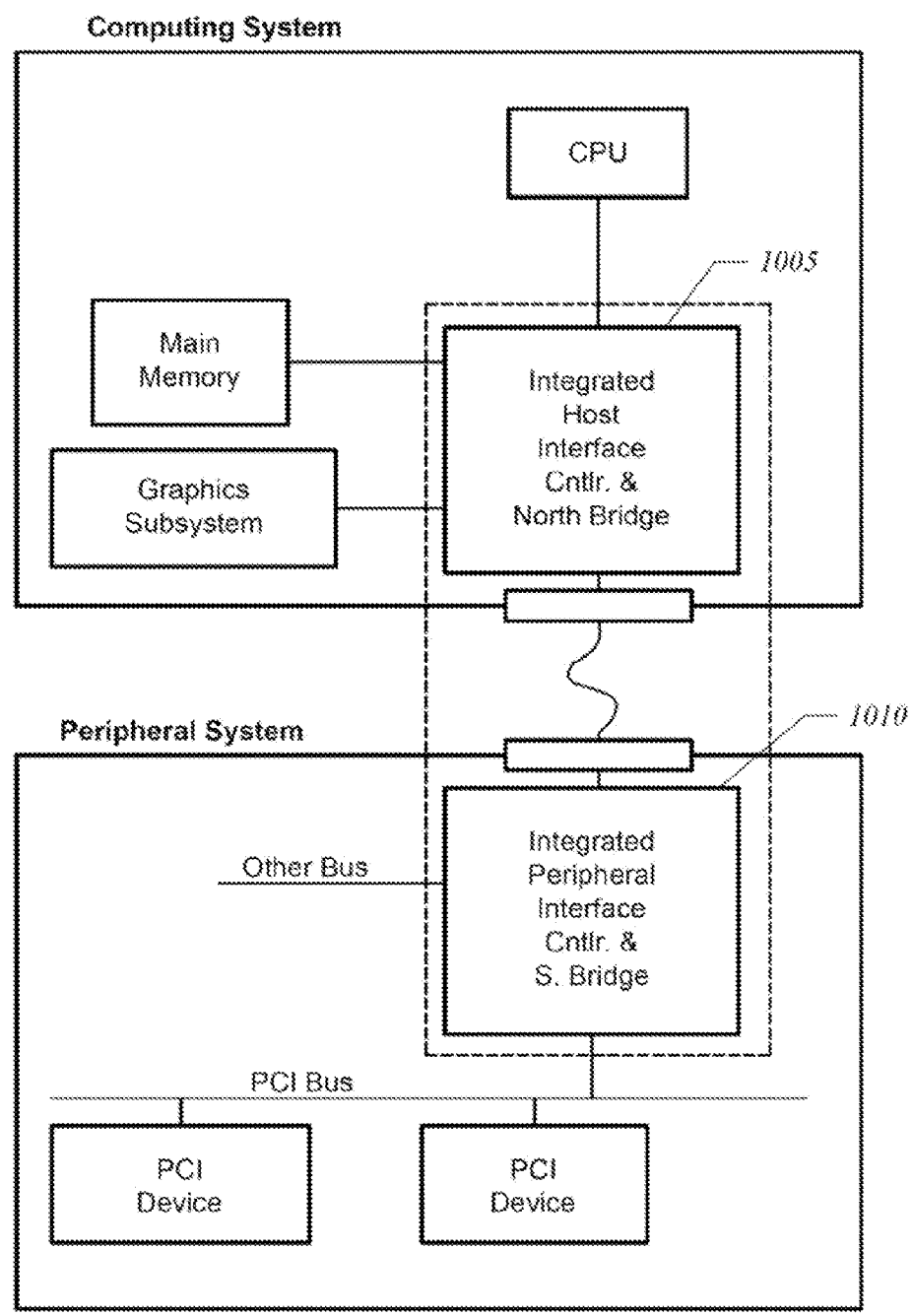
FIGURE 10
(NEW)

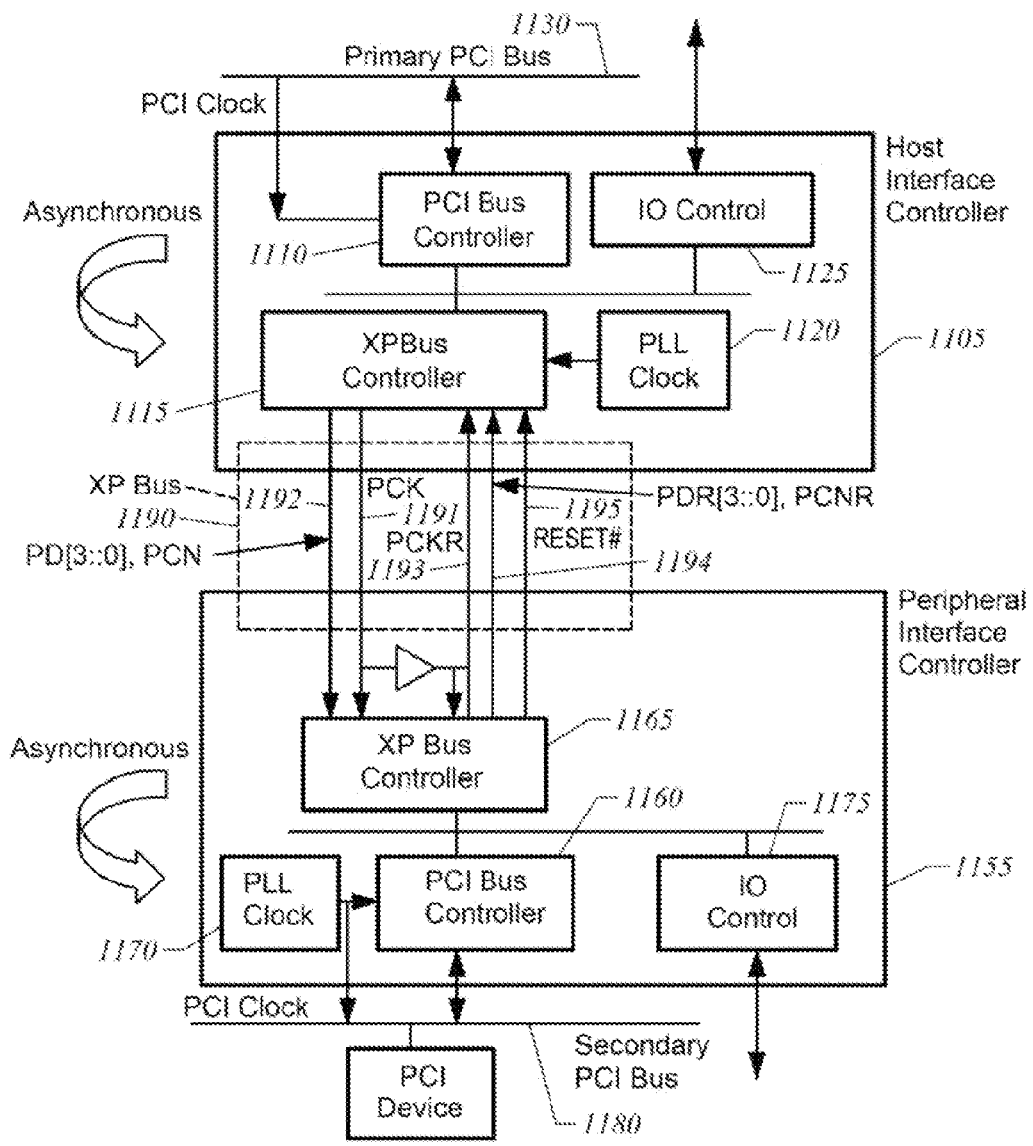
FIGURE 11
(NEW)

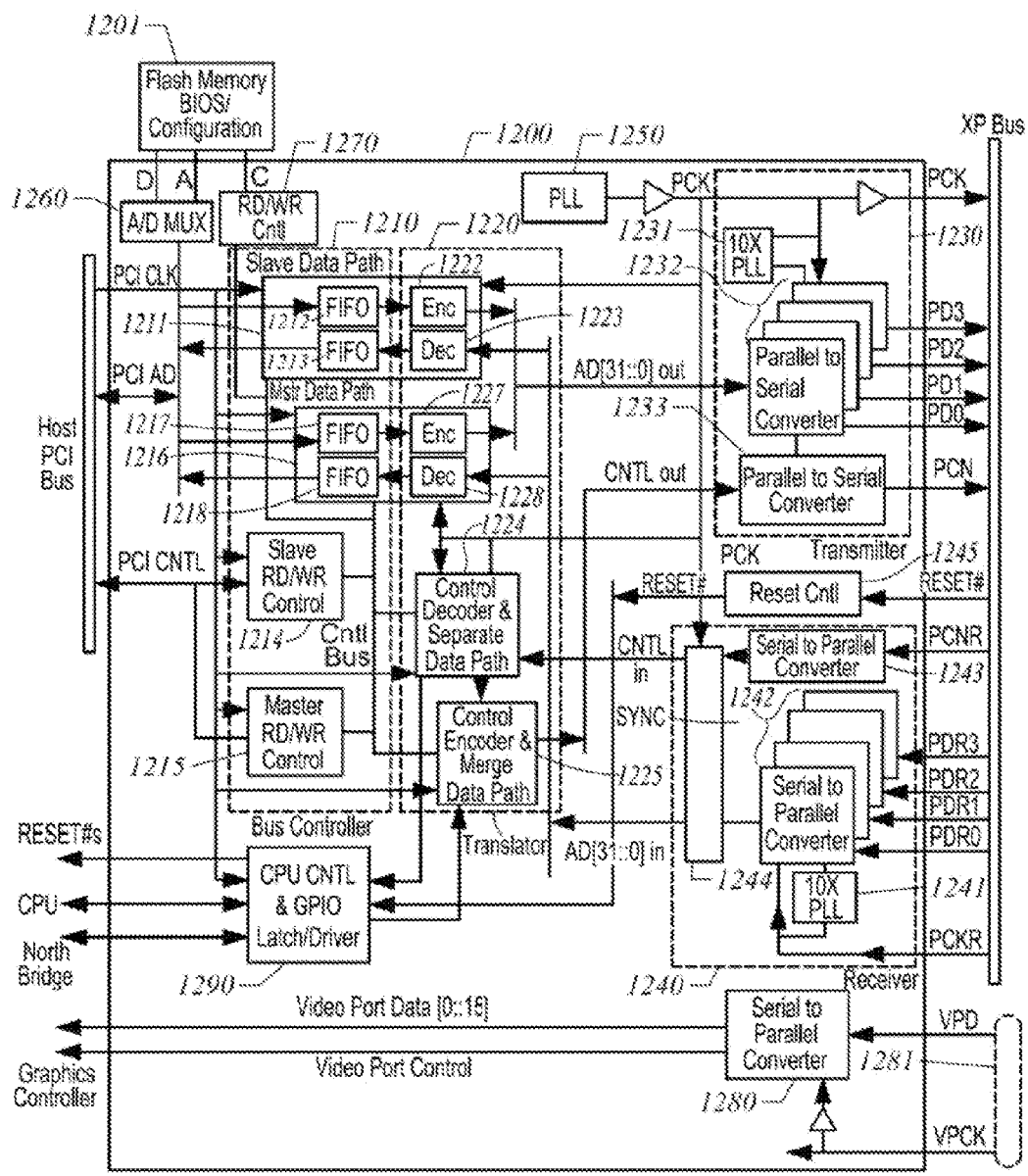
FIGURE 12
(NEW)

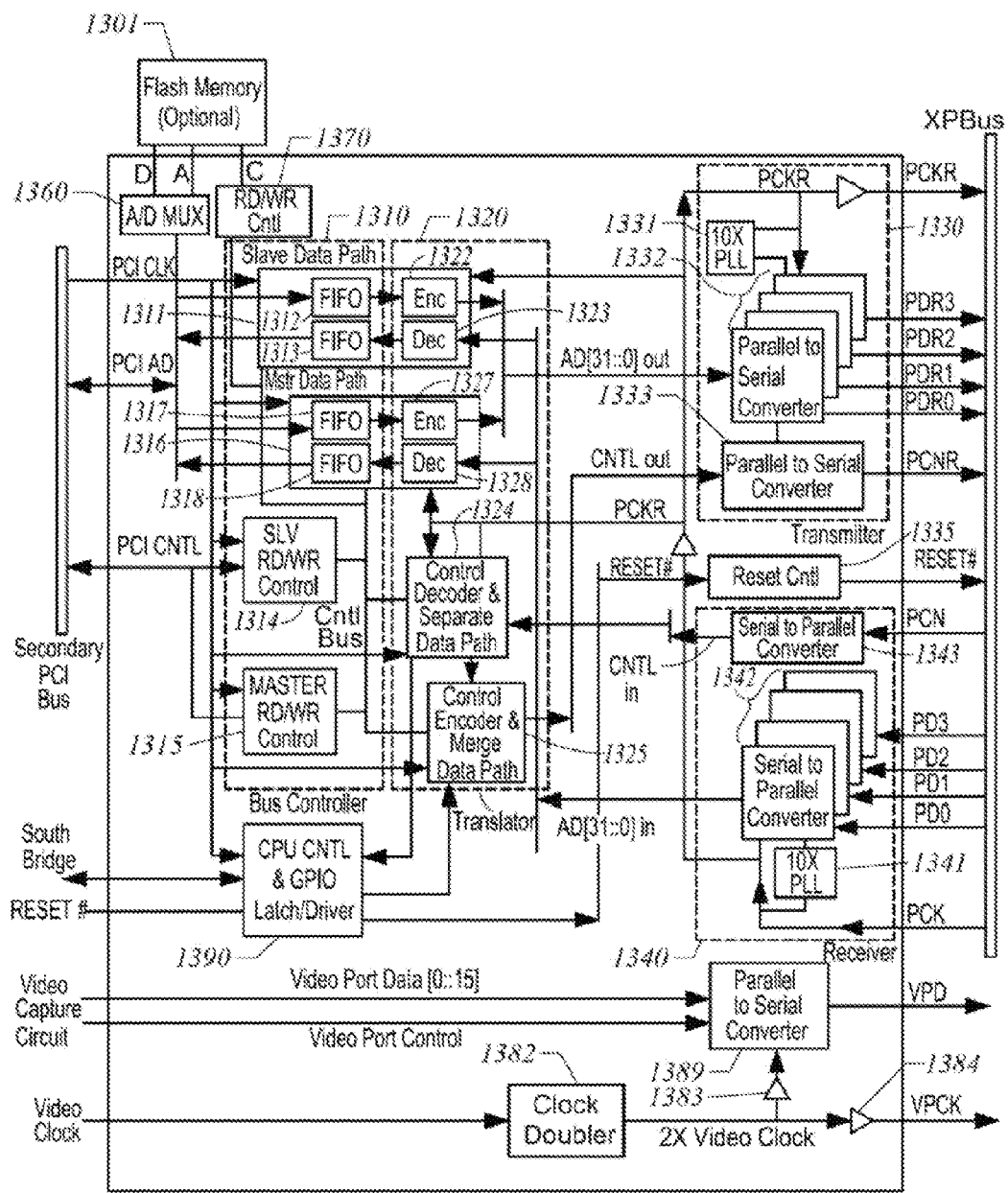
FIGURE 13
(NEW)

| | Symbol | Signal | Data Rate | Description |
|---|---|---|---|---|
| 1 | PD0 RTN | | | GND |
| 2 | PD0+ | Synch. To PCK | 10 x clock rate | Computer to Peripheral LVDS Data 0+ |
| 3 | PD0- | | | Computer to Peripheral LVDS Data 0- |
| 4 | PD1 RTN | | | GND |
| 5 | PD1+ | Synch. To PCK | 10 x clock rate | Computer to Peripheral LVDS Data 1+ |
| 6 | PD1- | | | Computer to Peripheral LVDS Data 1- |
| 7 | PD2 RTN | | | GND |
| 8 | PD2+ | Synch. To PCK | 10 x clock rate | Computer to Peripheral LVDS Data 2+ |
| 9 | PD2- | | | Computer to Peripheral LVDS Data 2- |
| 10 | PD3 RTN | | | GND |
| 11 | PD3+ | Synch. To PCK | 10 x clock rate | Computer to Peripheral LVDS Data 3+ |
| 12 | PD3- | | | Computer to Peripheral LVDS Data 3- |
| 13 | PCK RTN | | | GND |
| 14 | PCK+ | Clock | Clock rate | Computer to Peripheral LVDS Clock + |
| 15 | PCK- | | | Computer to Peripheral LVDS Clock - |
| 16 | PCN RTN | | | GND |
| 17 | PCN+ | Synch. To PCK | 10 x clock rate | Computer to Peripheral LVDS Control + |
| 18 | PCN- | | | Computer to Peripheral LVDS Control - |
| 19 | PDR0 RTN | | | GND |
| 20 | PDR0+ | Synch. To PCKR | 10 x clock rate | Peripheral to Computer LVDS Data 0+ |
| 21 | PDR0- | | | Peripheral to Computer LVDS Data 0- |
| 22 | PDR1 RTN | | | GND |
| 23 | PDR1+ | Synch. To PCKR | 10 x clock rate | Peripheral to Computer LVDS Data 1+ |
| 24 | PDR1- | | | Peripheral to Computer LVDS Data 1- |
| 25 | PDR2 RTN | | | GND |
| 26 | PDR2+ | Synch. To PCKR | 10 x clock rate | Peripheral to Computer LVDS Data 2+ |
| 27 | PDR2- | | | Peripheral to Computer LVDS Data 2- |
| 28 | PDR3 RTN | | | GND |
| 29 | PDR3+ | Synch. To PCKR | 10 x clock rate | Peripheral to Computer LVDS Data 3+ |
| 30 | PDR3- | | | Peripheral to Computer LVDS Data 3- |
| 31 | PCKR RTN | | | GND |
| 32 | PCKR+ | Reverse Dir Clock | Clock rate | Peripheral to Computer LVDS Clock + |
| 33 | PCKR- | | | Peripheral to Computer LVDS Clock - |
| 34 | PCNR RTN | | | GND |
| 35 | PCNR+ | Synch. To PCKR | 10 x clock rate | Peripheral to Computer LVDS Control + |
| 36 | PCNR- | | | Peripheral to Computer LVDS Control - |
| 37 | RESET# | | Asynchronous | Reset |

FIGURE 14

(NEW)

| PCK | CK+ | CK+ | CK+ | CK+ | CK- | CK- | CK- | CK- | CK+ | CK+ | CK+ | CK+ | CK- | CK- | CK- | CK- |
|---|---|---|---|---|---|---|---|---|---|---|---|---|---|---|---|---|
| PD0 | BS0 | CM0# | A00 | A01 | A02 | A03 | A04 | A05 | A06 | A07 | BS0 | BE0# | D00 | D01 | D02 | D03 | D04 | D05 | D06 | D07 |
| PD1 | BS1 | CM1# | A08 | A09 | A10 | A11 | A12 | A13 | A14 | A15 | BS1 | BE1# | D08 | D09 | D10 | D11 | D12 | D13 | D14 | D15 |
| PD2 | BS2 | CM2# | A16 | A17 | A18 | A19 | A20 | A21 | A22 | A23 | BS2 | BE2# | D16 | D17 | D18 | D19 | D20 | D21 | D22 | D23 |
| PD3 | BS3 | CM3# | A24 | A25 | A26 | A27 | A28 | A29 | A30 | A31 | BS3 | BE3# | D24 | D25 | D26 | D27 | D28 | D29 | D30 | D31 |
| PCN | CN0 | CN1 | CN2 | CN3 | CN4 | CN5 | CN6 | CN7 | CN8 | CN9 | CN0 | CN1 | CN2 | CN3 | CN4 | CN5 | CN6 | CN7 | CN8 | CN9 |

FIGURE 15
(NEW)

FIGURE 16
(NEW)

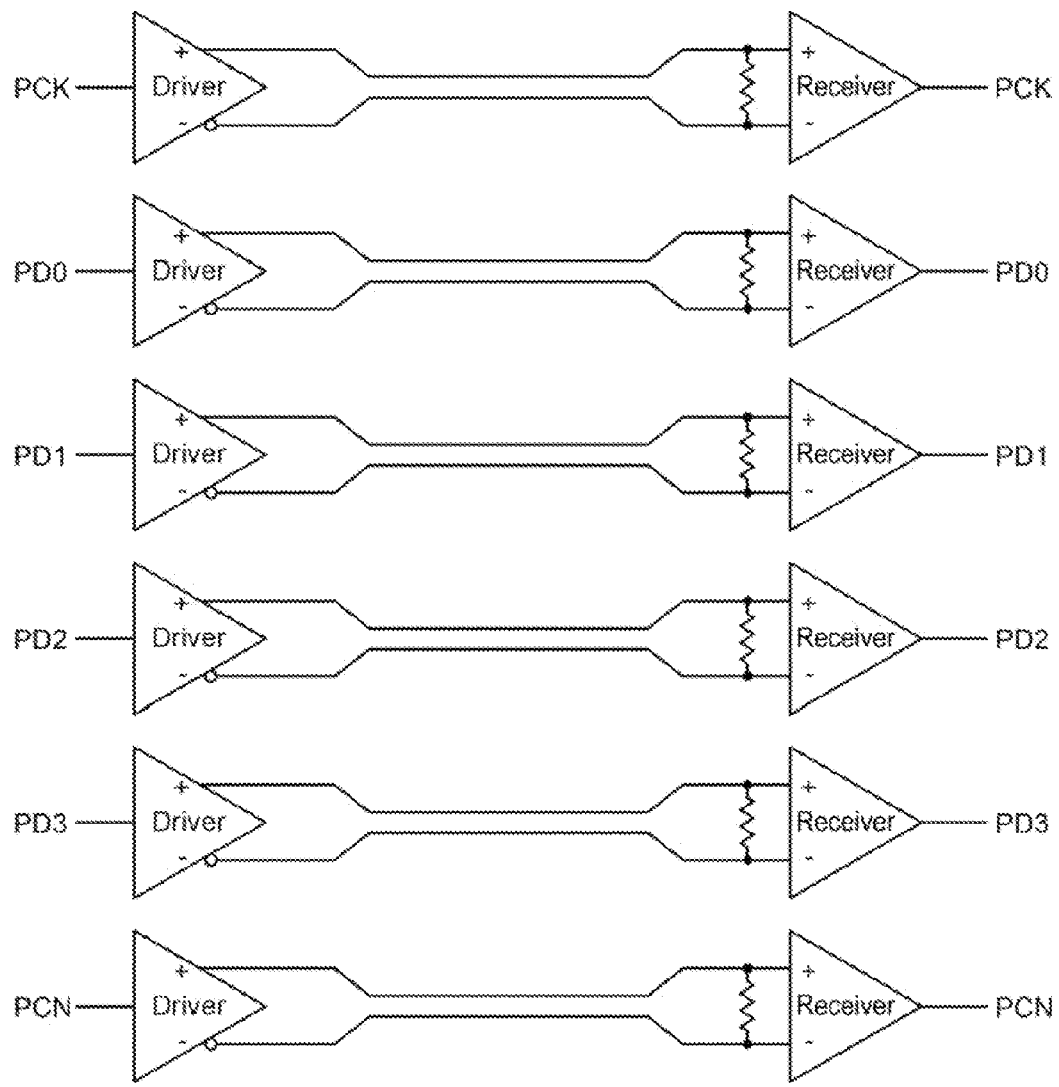
FIGURE 17
(NEW)

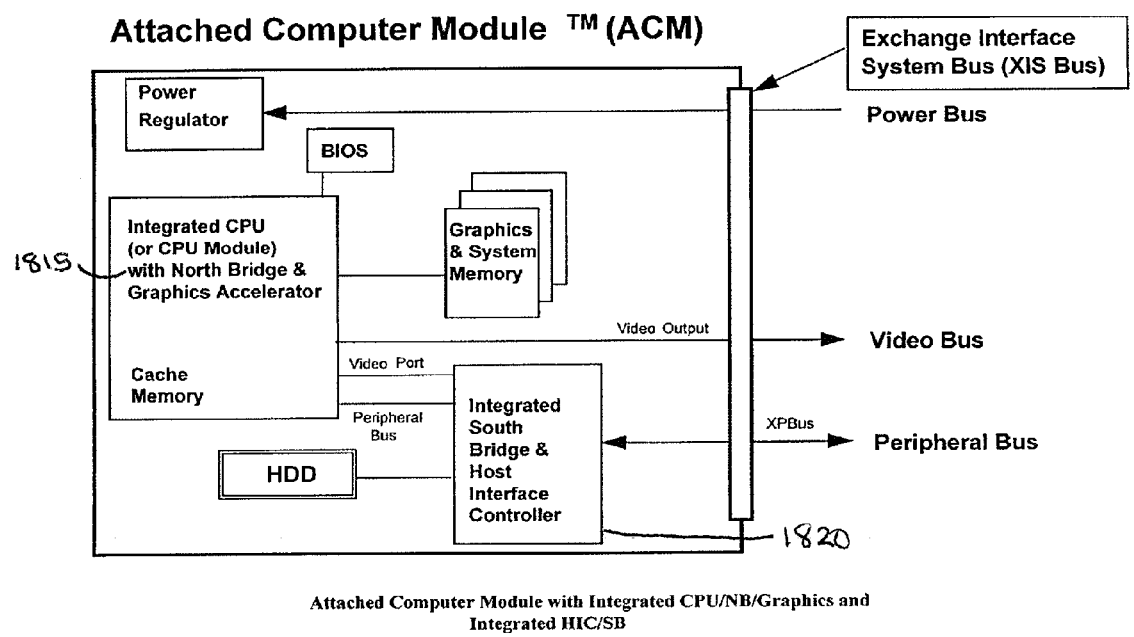
Attached Computer Module with Integrated CPU/NB/Graphics and Integrated HIC/SB
FIG. 18
(NEW)

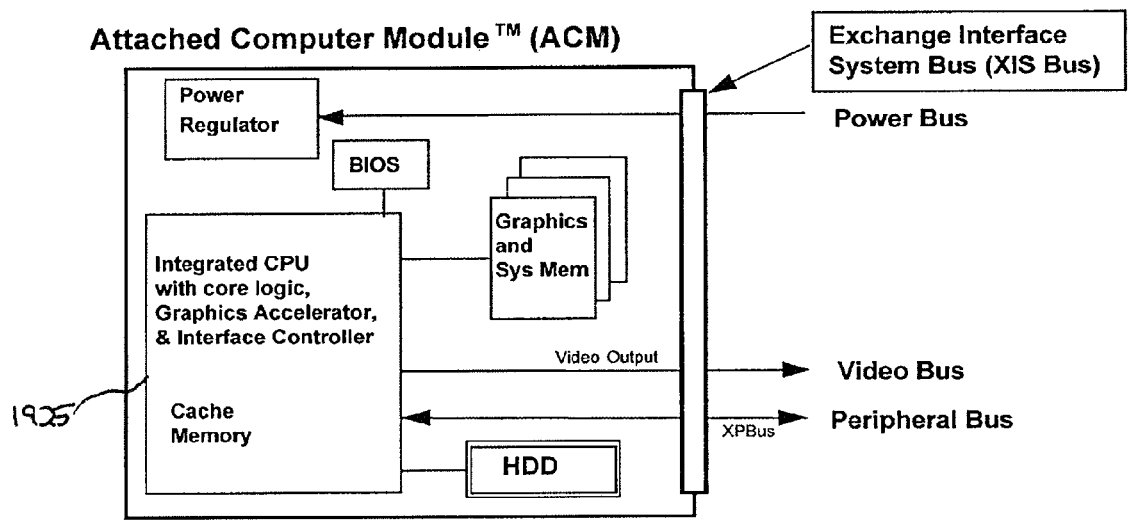
Attached Computer Module with Single Chip fully integrated: CPU, Cache, Core logic, Graphics controller and Interface controller
FIG. 19
(NEW)

US 7,328,297 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, after line 21:

*FIG. 8 is a block diagram of one embodiment of a computer system using the interface of the present invention.*
*FIG. 9 is a partial block diagram of a computer system using the interface of the present invention as a bridge between the north and south bridges of the computer system.*
*FIG. 10 is a partial block diagram of a computer system in which the north and south bridges are integrated with the host and peripheral interface controllers, respectively.*
*FIG. 11 is a block diagram of one embodiment of the host interface controller and the peripheral interface controller of the present invention.*
*FIG. 12 is a detailed block diagram of one embodiment of the host interface controller of the present invention.*
*FIG. 13 is a detailed block diagram of one embodiment of the PIC of the present invention.*
*FIG. 14 is a table showing the symbols, signals, data rate and description of signals in a first embodiment of the XPBus.*
*FIG. 15 is a table showing the information transmitted on the XPBus during two clock cycles of the XPBus in one embodiment of the present invention where 10 data bits transmitted in each clock cycle of the XPBus.*
*FIG. 16 is a table showing information transmitted on the XPBus during four clock cycles of the XPBus in another embodiment of the present invention where 10 data bits are transmitted in each clock cycle of the XPBus.*
*FIG. 17 is a schematic diagram of the signal lines PCK, PD0 to PD3, and PCN.*
*FIG. 18 shows an attached computer module with Integrated CPU/NB/Graphics and Integrated HIC/SB.*
*FIG. 19 shows an attached computer module with a fully integrated single chip: CPU, Cache, Core Logic, Graphics controller and Interface controller.*

Column 17, after line 67:

*One disadvantage of an interface having a relatively large number of conductive lines and pins is that it costs more than one that uses a fewer number of conductive lines and pins. Additionally, an interface having a large number of conductive lines is bulkier and more cumbersome to handle. Finally, a relatively large number of signal channels in the interface renders the option of using differential voltage signals less viable because a differential voltage signal method would require duplicating a large number of signal lines. It is desirable to use a low voltage differential signal (LVDS) channel in the computer system of the present invention because an LVDS channel is more cable friendly, faster, consumes less power, and generates less noise, including electromagnetic interferences (EMI), than a PCI channel. The term LVDS is herein used to generically refer to low voltage differential signals and is not intended to be limited to any particular type of LVDS technology.*

*The present invention overcomes the aforementioned disadvantages of the prior art by interfacing two PCI or PCI-like buses using a non-PCI or non-PCI-like channel. In the present invention, PCI control signals are encoded into control bits and the control bits, rather than the control signals that they represent, are transmitted on the interface channel. At the receiving end, the control bits representing control signals are decoded back into PCI control signals prior to being transmitted to the intended PCI bus.*

*The fact that control bits rather than control signals are transmitted on the interface channel allows using a smaller number of signal channels and a correspondingly small number of conductive lines in the interface channel than would otherwise be possible. This is because the control bits can be more easily multiplexed at one end of the interface channel and recovered at the other end than control signals. This relatively small number of signal channels used in the interface channel allows using LVDS channels for the interface. As mentioned above, an LVDS channel is more cable friendly, faster, consumes less power, and generates less noise than a PCI bus channel, which is used in the prior art to interface two PCI buses. Therefore, the present invention advantageously uses an LVDS channel for the hereto unused purpose of interfacing PCI or PCI-like buses. The relatively smaller number of signal channels in the interface also allows using connectors having smaller pins counts. As mentioned above an interface having a smaller number of signal channels and, therefore, a smaller number of conductive lines is less bulky and less expensive than one having a larger number of signal channels. Similarly, connectors having a smaller number of pins are also less expensive and less bulky than connectors having a larger number of pins.*

*In one embodiment, the present invention encompasses an apparatus for bridging a first computer interface bus and a second computer interface bus, in a microprocessor based computer system where each of the first and second computer interface buses have a number of parallel multiplexed address/data bus lines and operate at a dock speed in a predetermined dock speed range having a minimum dock speed and a maximum dock speed. The apparatus comprises an interface channel having a dock channel and a plurality of bit channels for transmitting bits; a first interface controller coupled to the first computer interface bus and to the interface channel to encode first control signals from the first computer interface bus into first control bits to be transmitted on the interface channel and to decode second control bits received from the interface channel into second control signals to be transmitted to the first computer interface bus; and a second interface controller coupled to the interface channel and the second computer interface bus to decode the first control bits from the interface channel into third control signals to be transmitted on the second computer interface bus and to encode fourth control signals from the second computer interface bus into the second control bits to be transmitted on the interface channel.*

*In one embodiment, the first and second interface controllers comprise a host interface controller (HIC) and a peripheral interface controller (PIC), respectively, the first and second computer interface buses comprise a primary PCI and a secondary PCI bus, respectively, and the interface channel comprises an LVDS channel.*

*In a preferred embodiment, the interface channel has a plurality of serial bit channels numbering fewer than the* number of parallel bus lines in each of the PCI buses and operates at a clock speed higher than the clock speed at which any of the bus lines operates. More specifically, the interface channel includes two sets of unidirectional serial bit channels which transmit data in opposite directions such that one set of bit channels transmits serial bits from the HIC to the PIC while the other set transmits serial bits from the PIC to the HIC. For each cycle of the PCI clock, each bit channel of the interface channel transmits a packet of serial bits.

The HIC and PIC each include a bus controller to interface with the first and second computer interface buses, respectively, and to manage transactions that occur therewith. The HIC and PIC also include a translator coupled to the bus controller to encode control signals from the first and second computer interface buses, respectively, into control bits and to decode control bits from the interface channel into control signals. Additionally, the HIC and PIC each include a transmitter and a receiver coupled to the translator. The transmitter converts parallel bits into serial bits and transmits the serial bits to the interface channel. The receiver receives serial bits from the interface channel and converts them into parallel bits.

FIG. 8 is a block diagram of one embodiment of a computer system 800 using the interface of the present invention. Computer system 800 includes an attached computer module (ACM) 805 and a peripheral console 810, which are described in greater detail in the application of William W. Y. Chu for "Personal Computer Peripheral Console With Attached Computer Module" filed concurrent with the present application on Sep. 8, 1998 and incorporated herein by reference. The ACM 805 and the peripheral console 810 are interfaced through an exchange interface system (XIS) bus 815. The XIS bus 815 includes power bus 816, video bus 817 and peripheral bus (XPBus) 818, which is also herein referred to as an interface channel. The power bus 816 transmits power between ACM 805 and peripheral console 810. In a preferred embodiment power bus 816 transmits power at voltage levels of 3.3 volts, 5 volts and 12 volts. Video bus 817 transmits video signals between the ACM 805 and the peripheral console 810. In a referred embodiment the video bus 817 transmits analog Red Green Blue (RGB) video signals for color monitors, digital video signals (such as Video Electronics Standards Association (VESA) Plug and Display's Transition Minimized Differential Signaling (TMDS) signals for flat panel displays), and television (TV) and/or super video (S-video) signals. The XPBus 818 is coupled to host interface controller (HIC) 819 and to peripheral interface controller (PIC) 820, which is also sometimes referred to as a bay interface controller.

In the embodiment shown in FIG. 8, HIC 819 is coupled to an integrated unit 821 that includes a CPU, a cache and a north bridge. In another embodiment, such as that shown in FIG. 9, the CPU 905 and north bridge 910 are separate rather than integrated units. In yet another embodiment, such as that shown in FIG. 10, the HIC and PIC are integrated with the north and south bridges, respectively, such that integrated HIC and north bridge unit 1005 includes an HIC and a north bridge, while integrated PIC and south bridge unit 1010 includes a PIC and a south bridge.

FIG. 11 is a more detailed block diagram of one embodiment of an HIC 1105 and a PIC 1155 of the present invention. HIC 1105 includes a peripheral component interconnect (PCI) bus controller 1110, an XPBus controller 1115, a phase lock loop (PLL) clock 1120 and an input/output (IO) control 1125. Similarly, PIC 1155 includes a PCI bus controller 1160, an XPBus controller 1165, a PLL clock 1170 and an IO control 1175. PCI bus controllers 1110 and 1160 are coupled to the primary and secondary PCI buses 1130 and 1180, respectively, and manage PCI transactions on the primary and secondary PCI buses 1130 and 1180, respectively. Similarly, XPBus Controllers 1115 and 1165 are coupled to XPBus 1190. XPBus controller 1115 drives the PCK line 1191 and PD[0::3] and PCN lines 1192 while XPBus controller 1165 drives the PCKR lines 1193, the PDR [0::3] and PCNR lines 1194 and the RESET# line 1195.

PCI bus controller 1110 receives PCI clock signals from the primary PCI bus 1130 and is synchronized to the PCI clock. However, as indicated in FIG. 11, the XPBus controller 1115 is as asynchronous with the PCI bus controller 1110. Instead, the XPBus controller receives a clock signal from the PLL clock 1120 and is synchronized therewith. PLL clock 1120 generates a clock signal independent of the PCI clock. The asynchronous operation of the PCI bus and the XPBus allows the PCI Bus to change in frequency, for example as in a power down situation, without directly affecting the XPBus clocking. In the embodiment shown in FIG. 11, the PLL clock 1120 generates a clock signal having a frequency of 66 MHz, which is twice as large as the 33 MHz frequency of the PCI clock. (The clock signal generated by the PLL clock may have a clock speed different from, including lower than, 66 MHz. For example, in another embodiment, which is discussed in greater detail below, the PLL clock 1120 generates a clock signal having a frequency of 132 MHz.)

The XPBus 1190 operates at the clock speed generated by the PLL clock 1120. Therefore, PCK, the clock signal from the XPBus controller 1115 to XPBus controller 1165 has the same frequency as the clock signal generated by PLL clock 1120. XPBus controller 1165 receives the PCK signal after it has been buffered and operates at the clock speed of PCK. The buffered version of the clock signal PCK is used to generate the clock signal PCKR, the clock signal form the XPBus controller 1165 to XPBus controller 1115. Accordingly, PCKR also has the same frequency as that generated by the PLL clock 1120. The synchronous operation of PCK and PCKR provides for improved reliability in the system. In another embodiment, PCKR may be generated independently of PCK and may have a frequency different from that of PCK. It is to be noted that even when PCKR is generated from PCK, the slew between PCK and PCKR cannot be guaranteed because of the unknown cable length used for the XPBus. For a cable that is several feet long, the cable propagation delay alone can be several nano seconds.

As indicated in FIG. 11, PLL clock 1170 is asynchronous with the XPBus controller 1165. Instead, PLL clock 1170 independently generates a clock signal that is used as a PCI clock signal on the secondary PCI bus 1180. The secondary PCI bus 1180 operates at the same dock speed as the primary PCI bus 1130, namely at a frequency of 33 MHz.

FIG. 12 is a detailed block diagram of one embodiment of the HIC of the present invention. As shown in FIG. 12, HIC 1200 comprises bus controller 1210, translator 1220, transmitter 1230, receiver 1240, a PLL 1250, an address/data multiplexer (A/D MUX) 1260, a read/write controller (RD/ WR Cntl) 1270, a video serial to parallel converter 1280 and a CPU control & general purpose input/output latch/driver (CPU CNTL & GPIO latch/driver) 1290.

HIC 1200 is coupled to an optional flash memory BIOS configuration unit 1201. Flash memory unit 1201 stores basic input output system (BIOS) and PCI configuration information and supplies the BIOS and PCI configuration information to A/D MUX 1260 and RD/WR Control 1270, which control the programming, read, and write of flash memory unit 1201.

Bus controller 1210 is coupled to the host PCI bus, which is also referred to herein as the primary PCI bus, and manages PCI bus transactions on the host PCI bus. Bus controller 1210 includes a slave (target) unit 1211 and a master unit 1216. Both slave unit 1211 and master unit 1216 each include two first in first out (FIFO) buffers, which are preferably asynchronous with respect to each other since the input and output of the two FIFOs in the master unit 1216 as well as the two FIFOs in the slave unit 1211 are clocked by different clocks, namely the PCI clock and the PCK. Additionally, slave unit 1211 includes encoder 1222 and decoder 1223, while master unit 1216 includes encoder 1227 and decoder 1228. The FIFOs 1212, 1213, 1217 and 1218 manage data transfers between the host PCI bus and the XPBus, which in the embodiment shown in FIG. 12 operate at 33 MHz and 66 MHz, respectively. PCI address/data (AD) from the host PCI bus is entered into FIFOs 1212 and 1217 before they are encoded by encoders 1222 and 1227. Encoders 1222 and 1227 format the PCI address/data bits to a form more suitable for parallel to serial conversion prior to transmittal on the XPBus. Similarly, address and data information from the receivers is decoded by decoders 1223 and 1228 to a form more suitable for transmission on the host PCI bus. Thereafter the decoded data and address information is passed through FIFOs 1213 and 1218 prior to being transferred to the host PCI bus. FIFOs 1212, 1213, 1217 and 1218, allow bus controller 1210 to handle posted and delayed PCI transactions and to provide deep buffering to store PCI transactions.

Bus controller 1210 also comprises slave read/write control (RD/WR Cntl) 1214 and master read/write control (RD/WR Cntl) 1215. RD/WR controls 1214 and 1215 are involved in the transfer of PCI control signals between bus controller 1210 and the host PCI bus.

Bus controller 1210 is coupled to translator 1220. Translator 1220 comprises encoders 1222 and 1227, decoders 1223 and 1228, control decoder & separate data path unit 1224 and control encoder & merge data path unit 1225. As discussed above encoders 1222 and 1227 are part of slave data unit 1211 and master data unit 1216, respectively, receive PCI address and data information from FIFOs 1212 and 1217, respectively, and encode the PCI address and data information into a form more suitable for parallel to serial conversion prior to transmittal on the XPBus. Similarly, decoders 1223 and 1228 are part of slave data unit 1211 and master data unit 1216, respectively, and format address and data information from receiver 1240 into a form more suitable for transmission on the host PCI bus. Control encoder & merge data path unit 1225 receives PCI control signals from the slave RD/WR control 1214 and master RD/WR control 1215. Additionally, control encoder & merge data path unit 1225 receives control signals from CPU CNTL & GPIO latch/driver 1290, which is coupled to the CPU and north bridge (not shown in FIG. 12). Control encoder & merge data path unit 1225 encodes PCI control signals as well as CPU control signals and north bridge signals into control bits, merges these encoded control bits and transmits the merged control bits to transmitter 1230, which then transmits the control bits on the data lines PD0 to PD3 and control line PCN of the XPBus. Examples of control signals include PCI control signals and CPU control signals. A specific example of a control signal is FRAME# used in PCI buses. A control bit, on the other hand is a data bit that represents a control signal. Control decoder & separate data path unit 1224 receives control bits from receiver 1240 which receives control bits on data lines PDR0 to PDR3 and control line PCNR of the XPBus. Control decoder & separate data path unit 1224 separates the control bits it receives from receiver 1240 into PCI control signals, CPU control signals and north bridge signals, and decodes the control bits into PCI control signals, CPU control signals, and north bridge signals all of which meet the relevant timing constraints.

Transmitter 1230 receives multiplexed parallel address/data (A/D) bits and control bits from translator 1220 on the AD[31::0] out and the CNTL out lines, respectively. Transmitter 1230 also receives a dock signal from PLL 1250. PLL 1250 takes a reference input clock and generates PCK that drives the XPBus. PCK is asynchronous with the PCI dock signal and operates at 66 MHz, twice the speed of the PCI dock of 33 MHz. The higher speed is intended to accommodate at least some possible increases in the operating speed of future PCI buses. As a result of the higher speed, the XPBus may be used to interface two PCI or PCI-like buses operating at 66 MHz rather than 33 MHz or having 64 rather than 32 multiplexed address/data lines.

The multiplexed parallel A/D bits and some control bits input to transmitter 1230 are serialized by parallel to serial converters 1232 of transmitter 1230 into 10 bit packets. These bit packets are then output on data lines PD0 to PD3 of the XPBus. Other control bits are serialized by parallel to serial converter 1233 into 10 bit packets and send out on control line PCN of the XPBus.

A $10^x$ multiplier 1231 receives PCK, multiplies it by a factor of 10 and feeds a clock signal 10 times greater than PCK into the parallel to serial converters 1232 and 1233. The parallel to serial converters 1232 and 1233 perform bit shifting at 10 times the PCK rate to serialize the parallel bits into 10 bit packets. As the parallel to serial converters 1232 and 1233 shift bits at 10 times the PCK rate, the bit rate for the serial bits output by the parallel to serial converters is 10 times higher than PCK rate, i.e., 660 MHz. However, the rate at which data packets are transmitted on the XPBus is the same as the PCK rate, i.e., 66 MHz. As the PCI buses operate at a clock and bit rate of 33 MHz, the XPBus has a clock rate that is twice as large and a bit rate per bit line (channel) that is 20 times as large as that of the PCI buses which it interfaces.

Receiver 1240 receives serial bit packets on data lines PDR0 to PDR3 and control line PCNR. Receiver 1240 also receives PCKR on the XPBus as well as the clock signal PCK from PLL 1250. The synchronizer (SYNC) 1244 of receiver 1240 synchronizes the clock signal PCKR to the locally generated clock signal, PCK, in order to capture the bits received from the XPBus into PCK clock timing.

Serial to parallel converters 1242 convert the serial bit packets received on lines PDR0 to PDR3 into parallel address/data and control bits that are sent to decoders 1223 and 1228 and control decoder and separate data path unit 1224, respectively. Serial to parallel converter 1243 receives control bit packets from control line PCNR, converts them to parallel control bits and sends the parallel control bits to control decoder & separate data path 1224.

A $10^x$ multiplier 1241 receives PCKR, multiplies it by a factor of 10 and feeds a clock signal 10 times greater than PCKR into the serial to parallel converters 1242 and 1243. Because the bits on PDR0 to PDR3 and PCNR are transmitted at a bit rate of 10 times the PCKR rate, the serial to parallel converters 1242 and 1243 perform bit shifting at 10 times the PCKR rate to convert the 10 bit packets into parallel bits. It is to be noted that the rate at which bit packets are transmitted on the XPBus is the same as the PCKR rate, i.e., 66 MHz. The parallel data and control bits are thereafter sent to decoders 1223 and 1228 by way of the AD[31::0] in line and to control decoder & separate data path unit 1224 by way of CNTL in lines, respectively.

Reset control unit 1245 of HIC 1200 receives the signal RESET#, which is an independent system reset signal, on the reset line RESET#. Reset control unit 1245 then transmits the reset signal to the CPU CNTL & GPIO latch/driver unit 1290.

As may be noted from the above, the 32 line host and secondary PCI buses are interfaced by 10 XPBus lines (PD0, PD1, PD2, PD3, PCN, PDR0, PDR1, PDR2, PDR3, PCNR). Therefore, the interface channel, XPBus, of the present invention uses fewer lines than are contained in either of the buses which it interfaces, namely the PCI buses. XPBus is able to interface such PCI buses without backup delays because the XPBus operates at a clock rate and a per line (channel) bit rate that are higher than those of the PCI buses.

In addition to receiving a reset signal, the CPU CNTL & GPIO latch/driver 1290 is responsible for latching input signals from the CPU and north bridge and sending the signals to the translator. It also takes decoded signals from the control decoder & separate data path unit 1224 and drives the appropriate signals for the CPU and north bridge.

In the embodiment shown in FIG. 12, video serial to parallel converter 1280 is included in HIC 1200. In another embodiment, video serial to parallel converter 1280 may be a separate unit from the HO 1200. Video serial to parallel converter 1280 receives serial video data on line VPD and a video clock signal VPCK from line VPCK of video bus 1281. It then converts the serial video data into 16 bit parallel video port data and the appropriate video port control signals, which it transmits to the graphics controller (not shown in FIG. 12) on the video port data [0::15] and video port control lines, respectively.

HIC 1200 handles the PCI bus control signals and control bits from the XPBus representing PCI control signals in the following ways:

1. HIC 1200 buffers clocked control signals from the host PCI bus, encodes into control bits and sends the encoded control bits to the XPBus;
2. HIC 1200 manages the signal locally; and
3. HIC 1200 receives control bits from XPBus, translates the control bits into PCI control signals and sends the PCI control signals to the host PCI bus.

FIG. 13 is a detailed block diagram of one embodiment of the PIC of the present invention. PIC 1300 is nearly identical to HIC 1200 in its function, except that HIC 1200 interfaces the host PCI bus to the XPBus while PIC 1300 interfaces the secondary PCI bus to the XPBus. Similarly, the components in PIC 1300 serve the same function as their corresponding components in HIC 1200. Reference numbers for components in PIC 1300 have been selected such that a component in PIC 1300 and its corresponding component in HIC 1200 have reference numbers that have the same two least significant digits. Thus for example, the bus controller in PIC 1300 is referenced as bus controller 1310 while the bus controller in HIC 1200 is referenced as bus controller 1210. As many of the elements in PIC 1300 serve the same functions as those served by their corresponding elements in HIC 1200 and as the functions of the corresponding elements in HIC 1200 have been described in detail above, the function of elements of PIC 1300 having corresponding elements in HIC 1200 will not be further described herein. Reference may be made to the above description of FIG. 12 for an understanding of the functions of the elements of PIC 1300 having corresponding elements in HIC 1200.

As suggested above, there are also differences between HIC 1200 and PIC 1300. Some of the differences between HIC 1200 and PIC 1300 include the following. First, receiver 1340 in PIC 1300, unlike receiver 1240 in HIC 1200, does not contain a synchronization unit. As mentioned above, the synchronization unit in HIC 1200 synchronizes the PCKR clock to the PCK dock locally generated by PLL 1250. PIC 1300 does not locally generate a PCK dock and therefore, it does not have a locally generated PCK dock with which to synchronize the PCK dock signal that it receives from HIC 1200. Another difference between PIC 1300 and HIC 1200 is the fact that PIC 1300 contains a video parallel to serial converter 1389 whereas HIC 1200 contains a video serial to parallel converter 1280. Video parallel to serial converter 1389 receives 16 bit parallel video capture data and video control signals on the Video Port Data [0::15] and Video Port Control lines, respectively, from the video capture circuit (not shown in FIG. 13) and converts them to a serial video data stream that is transmitted on the VPD line to the HIC. The video capture circuit may be any type of video capture circuit that outputs a 16 bit parallel video capture data and video control signals. Another difference lies in the fact that PIC 1300, unlike HIC 1200, contains a clock doubler 1382 to double the video clock rate of the video clock signal that it receives. The doubled video clock rate is fed into video parallel to serial converter 1389 through buffer 1383 and is sent to serial to parallel converter 1280 through buffer 1384. Additionally, reset control unit 1335 in PIC 1300 receives a reset signal from the CPU CNTL & GPIO latch/driver unit 1390 and transmits the reset signal on the RESET# line to the HIC 1200 whereas reset control unit 1245 of HIC 1200 receives the reset signal and forwards it to its CPU CNTL & GPIO latch/driver unit 1290 because, in the above embodiment, the reset signal RESET# is unidirectionally sent from the PIC 1300 to the HIC 1200.

Like HIC 1200, PIC 1300 handles the PCI bus control signals and control bits from the XPBus representing PCI control signals in the following ways:

1. PIC 1300 buffers docked control signals from the secondary PCI bus, encodes them and sends the encoded control bits to the XPBus;
2. PIC 1300 manages the signal locally; and
3. PIC 1300 receives control bits from XPBus, translates them into PCI control signals and sends the PCI control signals to the secondary PCI bus.

PIC 1300 also supports a reference arbiter on the secondary PCI Bus to manage the PCI signals REQ# and GNT#.

FIG. 14 is a table showing the symbols, signals, data rate and description of signals on the XPBus, where RTN indicates a ground (GND) reference.

FIG. 15 is a table showing the information transmitted on the XPBus during two clock cycles of the XPBus in one embodiment of the present invention where 10 data bits are transmitted in each dock cycle of the XPBus. In FIGS. 15, A00 to A31 represent 32 bits of PCI address A[31::0], D00 to D31 represent 32 bits of PCI data D[31::0], BS0 to BS3 represent 4 bits of bus status data indicating the status of the XPBus, CM0# to CM3# represent 4 bits of PCI command information, BE0# to BE3# represent 4 bits of PCI byte enable information, and CN0 to CN9 represent 10 bits of control information sent in each clock cycle. As shown in FIG. 15, for each of lines PD0 to PD3, the 10 bit data packets contain one BS bit, one CM/BE bit, and eight A/D bits. For the PCN line, the 10 bit data packet contains 10 CN bits. The first clock cycle shown in FIG. 15 comprises an address cycle in which 4 BS bits, 4 CM bits, 32 A bits and 10 CN bits are sent. The second clock cycle comprises a data cycle in which 4 BS bits, 4 BE bits, 32 D bits and 10 CN bits are sent. The bits transmitted on lines PD0 to PD3 represent 32 PCI AD[31::0] signals, 4 PCI C/BE# [3::0] signals, and part of the function of PCI control signals, such as FRAME#, IRDY#, and TRDY#.

In the embodiment shown in FIG. 15, BS0 to BS3 are sent at the beginning of each clock cycle. The bus status bits indicate the following bus cycle transactions: idle, address transfer, write data transfer, read data transfer, switch XPBus direction, last data transfer, wait, and other cycles.

Bits representing signals transmitted between the CPU and South Bridge may also be sent on the lines interconnecting the HIC and PIC, such as lines PCN and PCNR. For example, CPU interface signals such as CPU interrupt (INTR), Address 20 Mask (A20M#), Non-Maskable Interrupt (NMI), System Management Interrupt and (SMI#), and Stop Clock (STPCLK#), may be translated into bit information and transmitted on the XPBus between the HIC and the PIC.

FIG. 16 is a table showing the information transmitted on the XPBus during four clock cycles of the XPBus in another embodiment of the present invention where 10 data bits are transmitted in each clock cycle of the XPBus. In this embodiment, the XPBus clock rate is twice as large as the PCI clock rate. This allows sending data and address bits every other XPBus cycle. As can be seen in FIG. 16, there are no address or data bits transmitted during the second or fourth XPBus clock cycle. The fact that the XPBus clock rate is higher than the PCI clock rate allows for compatibility of the XPBus with possible future expansions in the performance of PCI bus to higher data transfer and clock rates.

In the embodiment shown in FIG. 16, there are 18 control bits, CN0 to CN17, transmitted in every two XPBus clock cycles. The first bit transmitted on the control line in each XPBus clock cycle indicates whether control bits CN0 to CN8 or control bits CN9 to CN17 will be transmitted in that cycle. A zero sent at the beginning of a cycle on the control line indicates that CN0 to CN8 will be transmitted during that cycle, whereas a one sent at the beginning of a cycle on the control line indicates that CN9 to CN17 will be transmitted during that cycle. These bits also indicate the presence or absence of data and address bits during that cycle. A zero indicates that address or data bits will be transmitted during that cycle whereas a one indicates that no address or data bits will be transmitted during that cycle.

In one embodiment, BS0 and BS1 are used to encode the PCI signals FRAME# and IRDY#, respectively. Additionally, in one embodiment, BS2 and BS3 are used to indicate the clock speed of the computer bus interface and the type of computer bus interface, respectively. For example, BS2 value of zero may indicate that a 33 MHz PCI bus of 32 bits is used whereas a BS2 value of one may indicate that a 66 MHz PCI bus of 32 bits is used. Similarly, a BS3 value of zero may indicated that a PCI bus is used whereas a BS3 value of one may indicated that another computer interface bus, such as an Institute of Electronics & Electrical Engineers (IEEE) 1394 bus, is used.

FIG. 17 is a schematic diagram of lines PCK, PD0 to PD3, and PCN. These lines are unidirectional LVDS lines for transmitting clock signals and bits such as those shown in FIGS. 15 and 16 from the HIC to the PIC, The bits on the PD0 to PD3 and the PCN lines are sent synchronously within every clock cycle of the PCK. Another set of lines, namely PCKR, PDR0 to PDR3, and PCNR, are used to transmit clock signals and bits from the PIC to HIC. The lines used for transmitting information from the PIC to the HIC have the same structure as those shown in FIG. 17, except that they transmit data in a direction opposite to that in which the lines shown in FIG. 17 transmit data. In other words they transmit information from the PIC to the HIC. The bits on the PDR0 to PDR3 and the PCNR lines are sent synchronously within every clock cycle of the PCKR. Some of the examples of control information that may be sent in the reverse direction, i.e. on PCNR line, include a request to switch data bus direction because of a pending operation (such as read data available), a control signal change in the target requiring communication in the reverse direction, target busy, and transmission error detected.

The XPBus which includes lines PCK, PD0 to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.

The XPBus lines, PD0 to PD3, PCN, PDR0 to PDR3 and PCNR, and the video data and clock lines, VPD and VPCK, are not limited to being LVDS lines, as they may be other forms of bit based lines. For example, in another embodiment, the XPBus lines may be IEEE 1394 lines.

It is to be noted that although each of the lines PCK. PD0 to PD3, PCN, PCKR, PDR0 to PDR3, PCNR, VPCK, and VPD is referred to as a line, in the singular rather than plural, each such line may contain more than one physical line. For example, in the embodiment shown in FIG. 17, each of lines PCK, PD0 to PD3 and PCN includes two physical lines between each driver and its corresponding receiver. The term line, when not directly preceded by the terms physical or conductive, is herein used interchangeably with a signal or bit channel which may consist of one or more physical lines for transmitting a signal. In the case of non-differential signal lines, generally only one physical line is used to transmit one signal. However, in the case of differential signal lines, a pair of physical lines is used to transmit one signal. For example, a bit line or bit channel in an LVDS or IEEE 1394 interface consists of a pair of physical lines which together transmit a signal.

A bit based line (i.e., a bit line) is a line for transmitting serial bits. Bit based lines typically transmit bit packets and use a serial data packet protocol. Examples of bit lines include an LVDS line, an IEEE 1394 line, and a Universal Serial Bus (USB) line.

FIG. 18 shows an attached computer module with integrated CPU/NB/Graphics 1815 and Integrated HIC/SB 1820. FIG. 20 shows an attached computer module with single chip 1925 fully integrated: CPU, Cache, Core Logic, Graphics controller and Interface controller.

THE DRAWING FIGURES HAVE BEEN CHANGED AS FOLLOWS:

FIG. 8 through FIG. 19 are new FIGS.

AS A RESULT OF REEXAMINATION, IT HAS BEEN DETERMINED THAT:

Claims 1-10, 16-25, 36-40, 45, 50-54, 60-73 and 79-88 are cancelled.

Claims 11, 15, 26, 31, 41, 46, 55 and 74 are determined to be patentable as amended.

Claims 12-14, 27-30, 32-35, 42-44, 47-49, 56-59 and 75-78, dependent on an amended claim, are determined to be patentable.

11. A computer system, comprising:
a console comprising an Ethernet hub controller, a first coupling site and a second coupling site, each coupling site comprising a connector and a slot, the console being a first enclosure housing the Ethernet hub controller, each coupling site, and
a plurality of computer modules, each coupled to one of the coupling sites through the connector and the slot; each computer module comprising
a second enclosure,
a processing unit,
a low voltage differential signal (LVDS) channel comprising at least two unidirectional serial bit channels to convey data in opposite directions,
a peripheral bridge directly coupled to the processing unit without any intervening Peripheral Component Interconnect (PCI) bus, the peripheral bridge transmitting and receiving serial bits of encoded PCI address and data bits of a PCI bus transaction over the LVDS channel, the LVDS channel extending from the peripheral bridge to convey the encoded PCI address and data bits,
a graphics subsystem,
a main memory coupled to the processing unit,
a flash memory device being configurable to store a password for preventing unauthorized access to the computer module, and
an Ethernet controller coupled to the Ethernet hub controller through the connector of the coupling site for communication between the computer modules;
and wherein each of the computer modules operates fully independent of each other.

15. The computer system of claim 11 wherein the Ethernet controller *is* adapted to transfer data between any two of the computer modules and to the external network.

26. A computer system, comprising:
a console comprising an Ethernet hub controller, a first coupling site and a second coupling site, each coupling site comprising a connector and a slot, the console being an enclosure housing the Ethernet hub controller, each coupling site, and
a plurality of computer modules, each coupled to one of the coupling sites through the connector and the slot; each computer module comprising
a processing unit,
a peripheral bridge directly coupled to the processing unit without any intervening Peripheral Component Interconnect (PCI) bus, the peripheral bridge outputting encoded address and data bits of a PCI bus transaction in serial form
a low voltage differential signal (LVDS) channel extending from the peripheral bridge to convey the encoded address and data bits of the PCI bus transaction in serial form, the LVDS channel comprising at least two unidirectional, differential signal pairs to convey data in opposite directions,
a graphics controller,
a main memory coupled to the processing unit,
a SCSI hard disk drive with a security program, and
an Ethernet controller coupled to the Ethernet hub controller through the connector of the coupling site for communication between the computer modules;
wherein each of the computer modules operates independent of each other, and wherein one of the computer modules can replace another one of the computer modules in operation.

31. A computer system comprising;
a console comprising a first coupling site, and a second coupling site, each coupling site comprising a connector and a slot; the console being an enclosure housing each coupling site[,] *and* an Ethernet hub controller, and
a plurality of computer modules; each computer module coupled to the coupling site through the connector and the slot, and comprising
processing unit,
a low voltage differential signal (LVDS) channel comprising a first plurality of unidirectional, differential signal pairs to convey data in a first direction and a second plurality of unidirectional, differential signal pairs to convey data in a second, opposite direction,
an integrated interface controller and bridge unit to communicate, over the LVDS channel, serial bits of encoded address and data bits of a Peripheral Component Interconnect (PCI) bus transaction, the integrated interface controller and bridge unit directly coupled to the processing unit without any intervening PCI bus,
a main memory coupled to the processing unit,
a graphics controller,
an Ethernet controller coupled to the Ethernet hub controller through the connector of the coupling site for communication between the computer modules,
a hard disk drive, and
a security program in combination with a password is configured to provide lock out of the hard disk drive;
wherein each of the computer modules is substantially similar in design to each other, and wherein one of the computer modules can provide protection against failure of another one of the computer modules.

41. A computer system, comprising:
a console comprising a first coupling site, a second coupling site, each coupling site comprising a connector, the console being an enclosure that is capable of housing each coupling site[,] *and* a serial communication hub controller coupled to an external network, and
a plurality of computer modules inserted into said console; each computer module coupled to one of the connectors of the console and comprising,
a processing unit,
an integrated interface controller and bridge unit to transmit and receive serial bits of a Peripheral Component Interconnect (PCI) bus transaction, the integrated interface controller and bridge unit directly coupled to the processing unit without any intervening PCI bus, the serial bits of the PCI bus transaction comprising encoded PCI address and data bits,
a low voltage differential signal (LVDS) channel comprising a first unidirectional, differential signal to convey data in a first direction and a second unidirectional differential signal air to convey data in a second, opposite direction, the LVDS channel extending from the integrated interface controller and bridge unit to convey the serial bits of the PCI bus transaction, a communication controller coupled to the serial communication hub controller through the connector of the coupling site to support communication with the other modules, a main memory coupled to the processing unit, a permanent password or identification code for allowing data access of the computer module, and a graphics controller coupled to the processing unit;

wherein each of the computer modules [provide] *provides* independent processing in the computer system; and wherein one of the computer modules is configured to provide protection against failure of another of the plurality of computer modules.

46. A computer system, comprising:

a console comprising an Ethernet hub controller, a first coupling site and a second coupling site, each coupling site comprising a connector and a slot, the console being an enclosure housing the Ethernet hub controller, the coupling sites, and a plurality of computer modules, each coupled to one of the coupling sites through the connector and the slot; each computer module comprising a processing unit,

*a peripheral bridge to output encoded address and data bits of a Peripheral Component Interconnect (PC) bus transaction in serial form, the peripheral bridge directly coupled to the processing unit without any intervening PCI bus,*

*a low voltage differential signal (LVDS) channel extending from the peripheral bridge to convey the encoded address and data bits of the PCI bus transaction in serial form,* a main memory coupled to the processing unit, a permanent password or identification code for allowing data access of the computer module, and an Ethernet controller coupled to the Ethernet hub controller through the connector of the coupling site for communication to another computer module;

wherein each of the computer modules operates fully independent of each other.

55. A method for operating a computer system, said method comprising:

providing a console comprising an Ethernet hub controller, a first coupling site, and a second coupling site, each coupling site comprising a connector and a slot;

inserting a first computer module into the first coupling site of the console; said computer module comprising a microprocessor unit coupled to a mass memory storage device, *a peripheral bride directly coupled to the microprocessor unit without any intervening Peripheral Component Interconnect (PCI) bus, and comprising an integrated interface controller, and a low voltage differential signal (LVDS) channel directly coupled to the integrated interface controller and comprising at least two unidirectional serial bit channels to convey data in opposite directions, the integrated interface controller operable to communicate, over the LVDS channel, serial bits of encoded address and data bits of a PCI bus transaction;*

*providing communication with the microprocessor unit through the peripheral bridge and the LVDS channel;* applying power to said computer module to execute a security program, said security program being stored in said mass storage device; and prompting for a user password from a user on a display coupled to the console;

sending the user password to the security program for access control to the computer module;

inserting a second computer module into the second coupling site of the console; the second computer module is substantially similar in design to the first computer module;

providing communication between the computer modules through the Ethernet hub controller;

wherein the computer modules operate fully independent of each other; and one of the computer modules can be configured to provide protection against failure of the other computer module.

74. A method for operating a computer system, said method comprising:

providing a console comprising an Ethernet hub controller, a first coupling site, and a second coupling site, each coupling site comprising a connector and a slot;

inserting a first computer module into the first coupling site of the console; said computer module comprising a microprocessor unit, *a peripheral bridge directly coupled to the microprocessor unit without any intervening Peripheral Component Interconnect (PCI) bus, and comprising an integrated interface controller, a low voltage differential signal (LVDS) channel coupled to the integrated interface controller and comprising at least two unidirectional, differential signal pairs to convey data in opposite directions*, a security program, and a flash memory device configured to store a password for preventing unauthorized access to the computer module, *the integrated interface controller operable to communicate, over the LVDS channel, encoded address and data bits of a PCI bus transaction in serial form;*

*providing communication with the microprocessor unit through the peripheral bridge and the LVDS channel;* applying power to said computer module; and prompting for the password from a user on a display coupled to the console;

sending the password to the security program for access control to the computer module;

inserting a second computer module into the second coupling site of the console; the second computer module is substantially similar in design to the first computer module;

providing communication between the computer modules through the Ethernet hub controller;

wherein the computer modules operate fully independent of each other; and one of the computer modules can be configured to provide protection against failure of the other computer module.

* * * * *